US011245157B2

(12) United States Patent
Winter et al.

(10) Patent No.: US 11,245,157 B2
(45) Date of Patent: Feb. 8, 2022

(54) LITHIUM OXYHALIDE BATTERY SEPARATOR MATERIAL

(71) Applicant: INNOSENSE LLC, Torrance, CA (US)

(72) Inventors: Raymond Winter, Riverside, CA (US); Maksudul M. Alam, Glendora, CA (US); Uma Sampathkumaran, Torrance, CA (US); John Abolencia, Los Angeles, CA (US)

(73) Assignee: INNOSENSE LLC, Torrance, CA (US)

( * ) Notice: Subject to any disclaimer, the term of this patent is extended or adjusted under 35 U.S.C. 154(b) by 210 days.

(21) Appl. No.: 16/289,026

(22) Filed: Feb. 28, 2019

(65) Prior Publication Data

US 2020/0280037 A1 Sep. 3, 2020

(51) Int. Cl.

| | | |
|---|---|---|
| *H01M 2/16* | (2006.01) |
| *H01M 2/14* | (2006.01) |
| *H01M 50/431* | (2021.01) |
| *H01M 50/403* | (2021.01) |
| *H01M 50/449* | (2021.01) |
| *H01M 10/052* | (2010.01) |
| *H01M 10/0587* | (2010.01) |
| *H01M 10/42* | (2006.01) |
| *H01M 10/0561* | (2010.01) |
| *H01M 10/0563* | (2010.01) |

(52) U.S. Cl.
CPC ....... *H01M 50/431* (2021.01); *H01M 50/403* (2021.01); *H01M 50/449* (2021.01); *H01M 10/052* (2013.01); *H01M 10/0561* (2013.01); *H01M 10/0563* (2013.01); *H01M 10/0587* (2013.01); *H01M 10/4235* (2013.01); *Y02E 60/10* (2013.01)

(58) Field of Classification Search
CPC .......... H01M 10/052; H01M 10/0561; H01M 10/0563; H01M 10/0587; H01M 10/4235; H01M 50/403; H01M 50/431; H01M 50/449; Y02E 60/10
See application file for complete search history.

(56) References Cited

U.S. PATENT DOCUMENTS

| 2017/0324073 A1* | 11/2017 | Herle | H01M 50/403 |
| 2019/0341584 A1* | 11/2019 | Schreiber | H01M 4/1391 |

* cited by examiner

*Primary Examiner* — Lingwen R Zeng
(74) *Attorney, Agent, or Firm* — M.J. Ram and Associates

(57) ABSTRACT

Methods for producing ceramic films Yttria Stabilized Zirconia (3YSZ) and aluminum titanate ($Al_2TiO_5$), and the physical properties of these films are described. The films produced have thicknesses and integrity suitable for handling and corrosion resistance to electrolytes, porosity, ion permeability and electrical resistivity suitable for use as separators between positive and negative layers for forming electrical batteries, particularly lithium batteries.

13 Claims, 32 Drawing Sheets

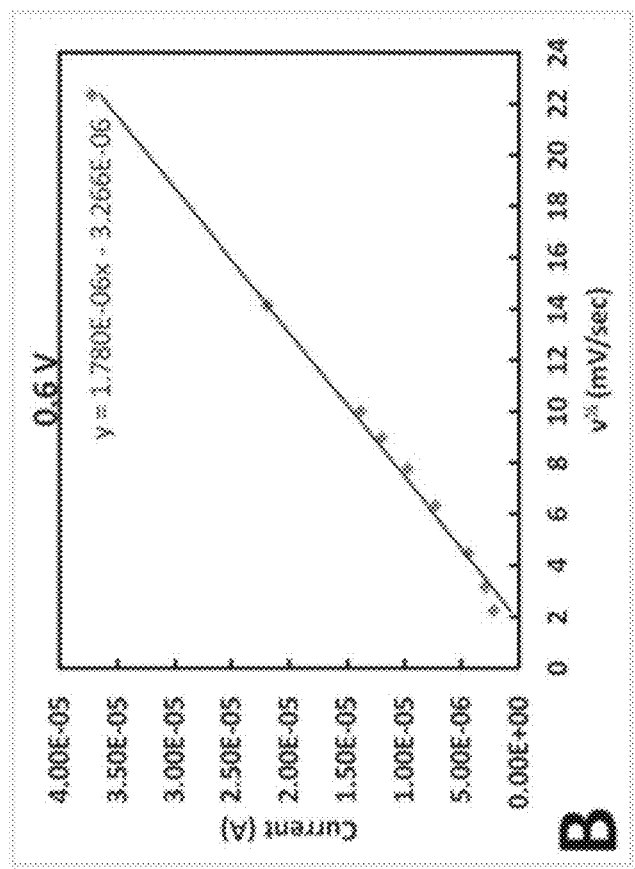
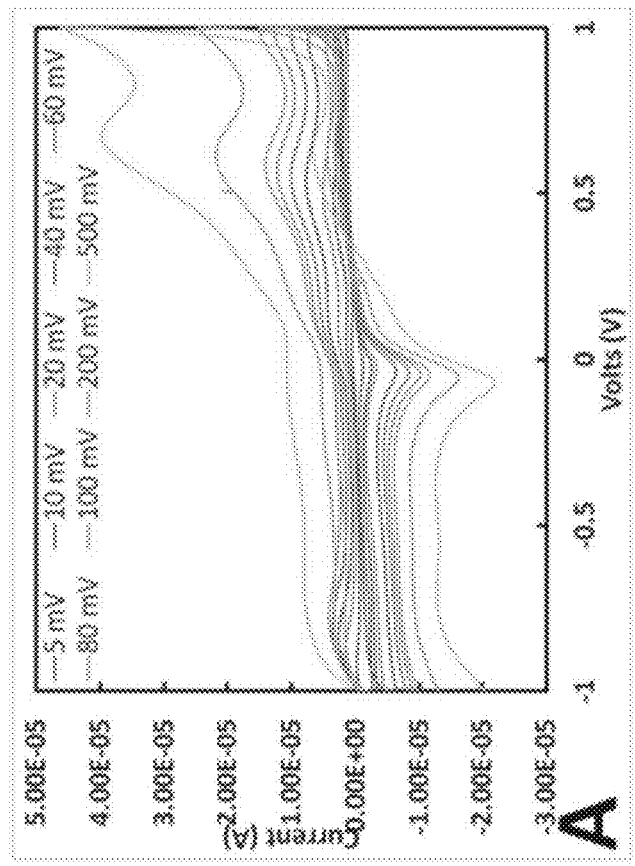
FIG 43A
FIG 43B

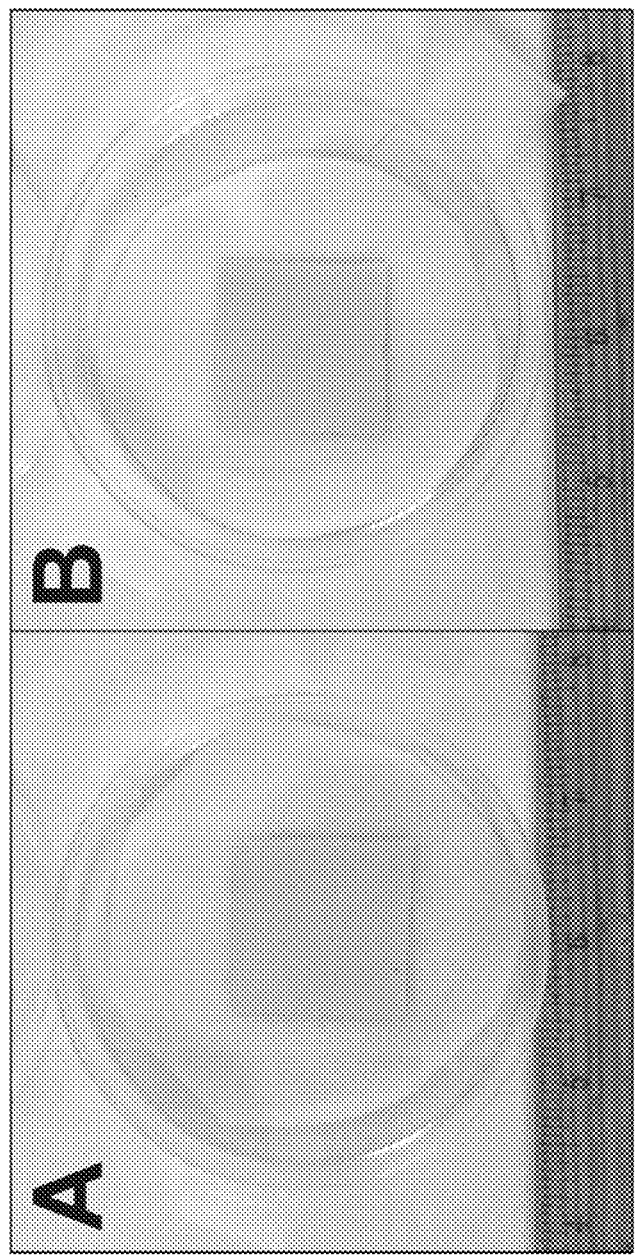

LITHIUM OXYHALIDE BATTERY SEPARATOR MATERIAL

This invention was made with Government support under HQ0147-16-C-7018, awarded by the US Missile Defense Agency. The US Government has certain rights in the inventions described herein.

BACKGROUND

There is a need to decrease downtime and increase lifetime and safety of batteries installed in systems that are inactive for long periods of time but must be maintained in a standby status for rapid deployment. For example, lithium oxyhalide batteries (LOHB) and potentially other Lithium-based batteries used in such systems include separators made of microporous polytetrafluoroethylene (PTFE) or glass fiber materials. These separators are expensive and their lifetime and safety is limited.

SUMMARY

High quality ceramic, rollable separators (CeRollS™) described herein, which are designed to replace currently used battery separators, demonstrate improved performance and lower cost as a result, in part, of increasing operational lifetime. LOHB separators are required to: (a) electrically isolate electrodes, (b) be ion permeable, (c) withstand corrosive electrolytes, (d) be suitable for a production environment, including mechanical flexibility and handling, (e) maximize volumetric efficiency for electrolyte capacity, (f) extend shelf life, and (g) optimize efficient electrolyte flow and distribution when the battery is activated, thereby minimizing overall cost. CeRollS can be used with existing PTFE and glass separators as an additional layer, with even greater safety, reliability and useable life. However, this combination with the glass and PTFE separators does increase the thickness of the battery.

Applicant has demonstrated that the CeRollS technology described herein meets performance standards at an electrochemical cell level. Further, the described CeRollS material shows an increased corrosion resistance to thionyl chloride and sulfuryl chloride while being flexible.

Described herein are:
Successful fabrication of a new battery separator including tape casting and firing to form a flexible ceramic ($Al_2TiO_5$) separator material,
Demonstrated superior corrosion resistance to thionyl chloride, 12N hydrochloric acid (HCl) and sulfuryl chloride while two commercially available separator materials failed the same test.
Demonstrated enhanced durability of the CeRollS separators while remaining intact after >89—days in 12N HCl, >277 days in thionyl chloride, and >277 days in sulfuryl chloride.
Superior permeability characteristics demonstrated by better ionic permeability than commercial separator materials: Two different $Al_2TiO_5$ products produced as described herein showed an ion permeability of ~1.16× $10^{-15}$ cm²/sec. and ~1.75×$10^{-15}$ cm²/sec; the first of the two $Al_2TiO_5$ products having the more desirable ion permeability.
Enhanced electrical resistivity of >5.4×$10^8$ Ohm-cm. compared to literature limits of $10^{14}$ Ohm-cm).

BRIEF DESCRIPTION OF DRAWINGS

FIGS. 10A and 1013 are images shown in *J. Mater. Sci.* (2011) 46:1211-1219: for 50-150 μm granules, with the particles being 0.1 to 1.5 μm.

FIG. 15B illustrates an unfired sample that is nearly pin hole-free when examined with a light box; FIG. 15C is also nearly pin-hole free after firing at 875° C.

FIGS. 21A and 21B show the surface at 500× and 2,000× magnification respectively and FIGS. 21C and 21D show the fractured surface revealing internal porosity and a sintered grain structure. There is no apparent delamination.

FIGS. 22A and 22B show the surface at 500× and 2,000× magnification respectively and FIGS. 22C and 22D show the fracture surface showing high internal porosity with a well sintered grain structure; there is no apparent delamination.

FIGS. 23A and 23B show the surface at 500× and 2,000× magnification respectively and FIGS. 23C and 23D show the fracture surface showing internal porosity and a sintered grain structure; some minor delamination is shown indicating that the fired 3YSZ can be friable.

FIG. 43A shows cyclic voltammetry data from a potentiostat for ManniGlas with rising scan rates; FIG. 43B shows the slope extracted from the rising anodic peak.

FIGS. 49A and 49B show two examples of 1.5 in.×1.5 in. Al$_2$TiO$_5$ samples after firing at 1500° C.

DETAILED DESCRIPTION

Described herein is the development of a better performing, cost-competitive, high quality ceramic, rollable separator (CeRollS™) designed to overcome issues associated with other battery separators such as Polytetrafluoroethylene (PTFE) and particularly micro-porous separators used in lithium oxyhalide batteries (LOHBs), specifically batteries requiring frequent field replacement due to safety concerns and increased maintenance costs due to the frequency of necessary maintenance.

The suitability of an all-ceramic separator has been successfully demonstrated, the separator showing flexibility for handling, excellent resistance to typical LOHB electrolytes (thionyl chloride and sulfuryl chloride), and good ion permeability. CeRollS separator samples produced with sizes up to of 1.5 in.×1.5 in. demonstrated apparent porosities ranging from 6.5-49.9%, for fired thicknesses of ~102-195 µm. Sample pore diameters varied, based on thickness and processing parameters, from 0.50-42 µm. While other commercial separators such as ManniGlas 1200 (fiberglass) decomposed in 12N hydrochloric acid (HCl) in 9 days and white Celgard (polyethylene-propylene) turned transparent in thionyl chloride after 15 days, CeRollS separators described herein were still intact to the extent of testing, i.e., after >89 days in 12N HCl, >54 days in thionyl chloride, and >19 days in sulfuryl chloride.

Processing conditions changes have been identified to improve the tape casting formulation, drying, and firing processes to:
1. Increase flexibility, handleability, and safety for an all-ceramic separator,
2. Produce larger, full-size separators at-least three (3) inches across,
3. Increase production capabilities to provide sufficient improved samples to be used for further testing of ion permeability, chemical stability and electrical resistivity, and
4. Provide cell level testing including tensile strength with a target of <2% offset at 1,000 psig and a puncture strength >300 g/mil.

Figure 1A:
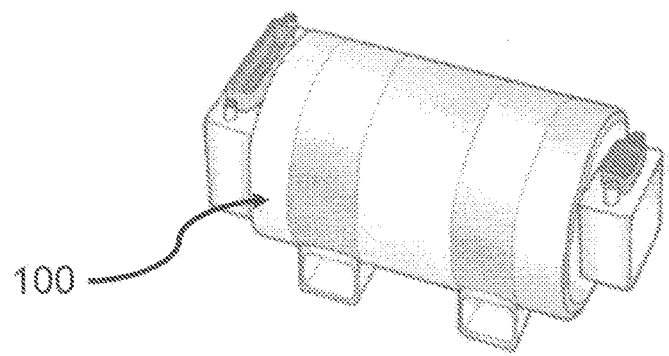
FIG. 1A shows a battery incorporating features of the invention said battery having broad applications in any environment requiring a battery with long term stability.
Figure 1B:
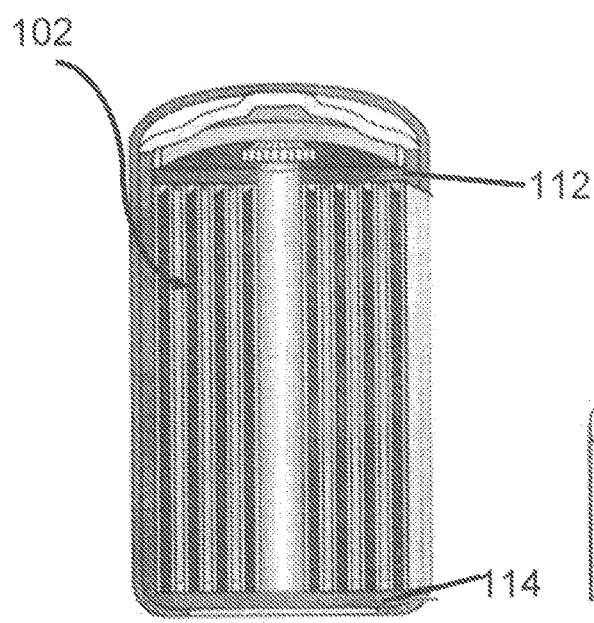
FIG. 1B is an enlarged view, a cut-away view of the battery of FIG. 1A, the device referred to CeRollS for Lithium battery applications.
Figure 1C:
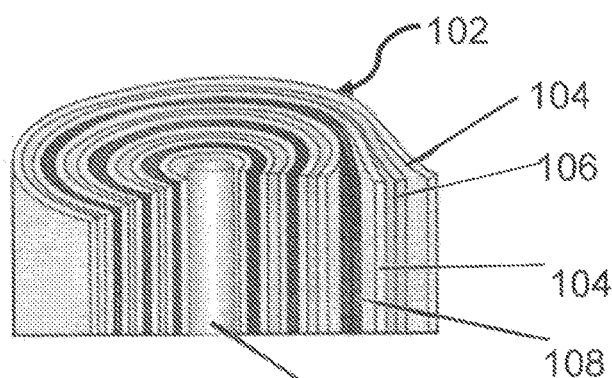
FIG. 1C is a further cut-away, enlarged view of the battery of FIGS. 1A and 1B.

A key motivation for the CeRollS development work was to develop a new LOHB separator with improved performance and an increased operational lifetime resulting in decreased operating costs. The target product is illustrated in FIGS. 1A-1C. FIG. 1A illustrates an assembled battery 100 containing a rolled structure 102, said rolled structure 102 shown in a cut-away view in FIGS. 1B and 1n a further enlarged view in FIG. 1C. The ceramic separators 104 separate the positive electrode 106 and negative electrodes 108 assembled in a rolled structure 110 (FIG. 1A) with the positive electrodes 106 (FIG. 1C) connected to a positive electrode collector 112 and the negative electrodes 108 connected to a negative electrode collector 114. While the Figures illustrate a rolled structure, the ceramic separators 104 and can easily be used in planar stacked Li batteries.

As alternate ceramic separators, a flexible 3 mol % Yttria Stabilized Zirconia (3YSZ) material and aluminum titanate ($Al_2TiO_5$) (Rivero, Palacio F. "Reactive Sintering of Aluminum Titanate"; Irene Barrios deArenas; Instituto Universitario de Tecnologia; Venezuela; p. 503. http://cdn.intechopen.com/pdfs/29796.pdf), said article incorporated herein in its entirety by reference, were evaluated. These potentially flexible materials were produced by two different mechanisms: (a) strain relief theory for YSZ and (b) microcrack hinge theory for $Al_2TiO_5$. Tape casting was used to successfully produce thin flexible green films which were then fired to form thin films for use as battery separator membranes, a use not shown nor suggested in the literature. CeRollS separators: (a) electrically isolate electrodes, (b) have suitable ion permeable, (c) withstand corrosive electrolytes, (d) are suitable for a production environment, including demonstrate mechanical flexibility and handling, (e) maximize volumetric efficiency for electrolyte capacity, (f) have an extended shelf life, and (g) provide optimized efficient electrolyte flow and distribution.

Figures 2A, 2B:
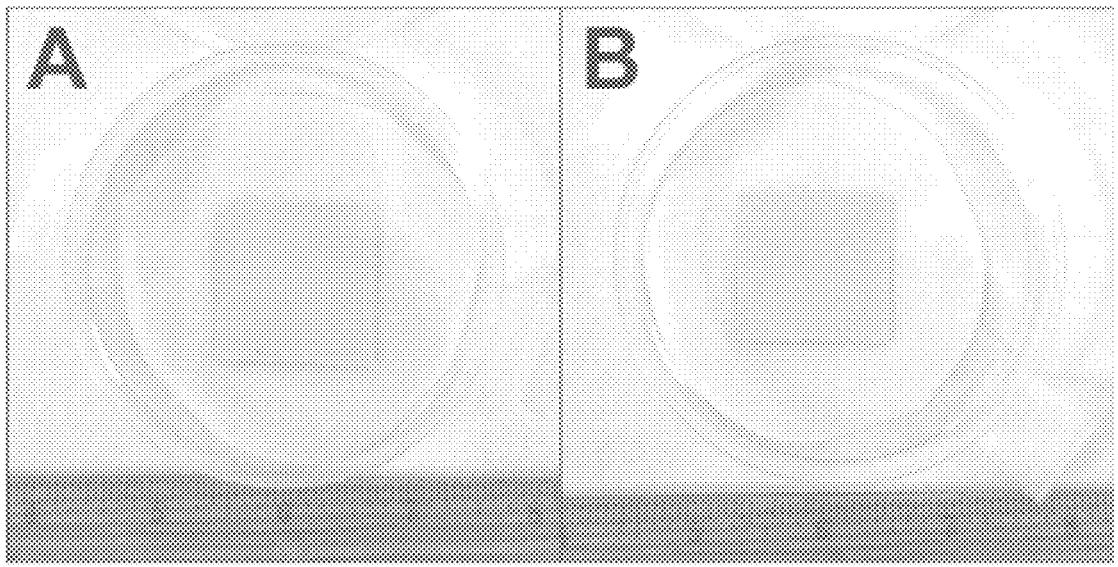
FIGS. 2A and 2B show two examples of pieces of $Al_2TiO_5$ films after firing at 1500° C.
Figures 3A, 3B, 3C:
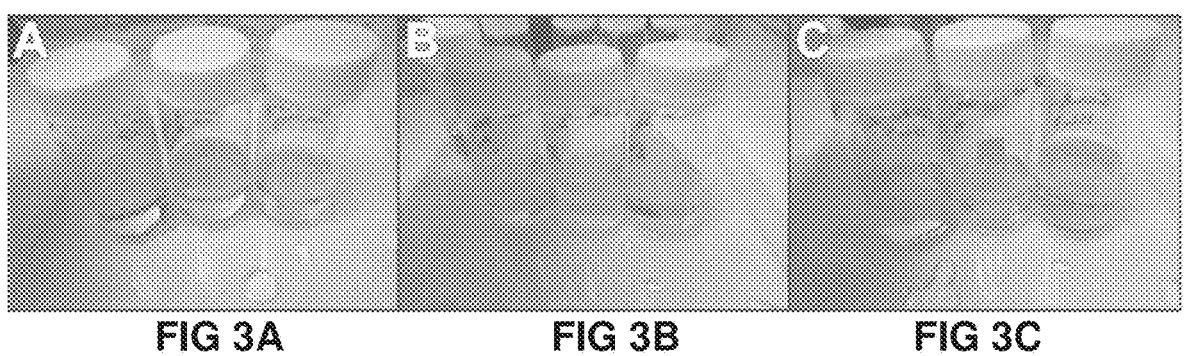
FIGS. 3A-3C illustrate corrosion testing in thionyl chloride where 3A shows Celgard® to be transparent after 15 days but not completely dissolved in the 99% thionyl chloride electrolyte (<1 wt % loss); 3B shows ManniGlas 1200 with a lack of integrity after 15 days and 3C shows an $Al_2TiO_5$ CeRollS to be intact after 15 days.
Figures 4A, 4B, 4C:
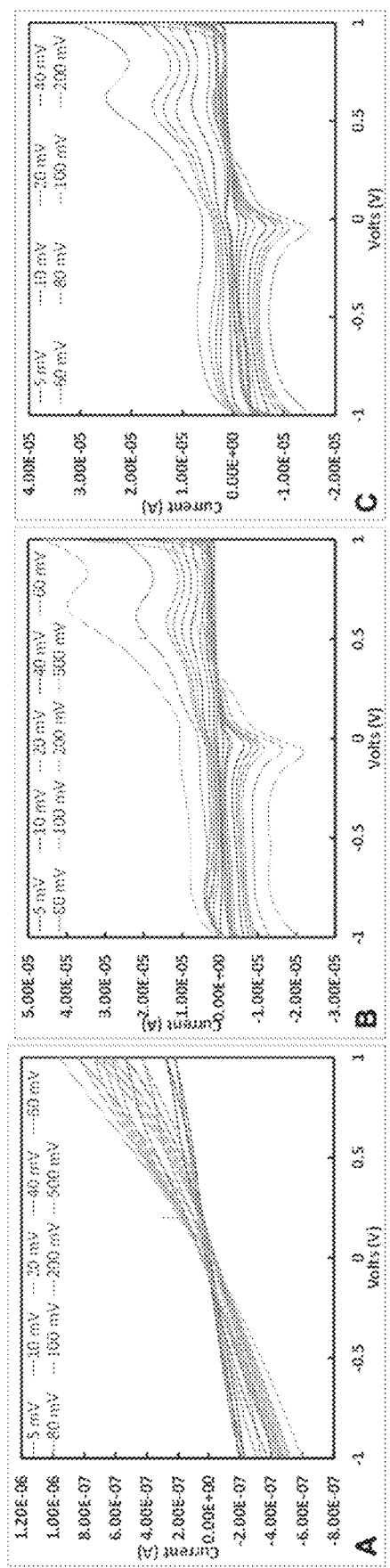
FIGS. 4A-4C. shows cyclic voltammetric profiles taken under identical aqueous electrolyte conditions for comparison of ion permeability for Celgard, (4A) ManniGlas® 1200 (4B), and $Al_2TiO_5$ CeRollS (4C).

The overall goal was to develop a new LOHB separator with improved performance, lower cost and increased operational lifetime, based on a cast and fired all ceramic, flexible tape material. The CeRollS product was also evaluated for corrosion resistance over time and ion permeability. While the material was not as flexible as intended, all the other objectives were met. Initial examples of fired $Al_2TiO_5$ measured 1.5 in.×1.5 in. Two examples (identified as samples 072716RW3091-1-5 and 072716RW3091-1-10), shown in FIGS. 2A and 2B were fired in different lots, using the same firing conditions. Apparent porosities ranged from 6.5 to 49.9% for samples with fired thicknesses of ~132-195 µm. A variety of parameters including tape casting slip formulation, tape cast head gap, drying techniques, low temperature (120° F.) press lamination, and furnace firing profiles were evaluated to develop an initial, partially optimized process. Superior resistance to corrosion from thionyl chloride was achieved. The details of corrosion testing and resistance to other electrolytes tested (12 N HCl and sulfuryl chloride) are discussed below. Volume electrical resistivity was also measured and is described below. The resistivities were >3.43×10$^{11}$ for Celgard, >1.60×10$^9$ for ManniGlas, and >5.43×10$^8$ Ohm-cm for $Al_2TiO_5$. While the $Al_2TiO_5$ sample measured at ~10$^9$ Ohm-cm, the measured value is acceptable, when compared to the text book value for $Al_2TiO_5$ of 10$^{14}$ Ohm-cm, the lower measured value is possibly due to the limitations of the Agilent test unit, or to impurities from processing. Electrometer measurements are being pursued to clarify this discrepancy.

Table 1 summarizes the target properties and the properties of the materials actual produced.

TABLE 1

COMPARISON OF CeRollS FORMULATIONS TO TARGET LITHIUM BATTERY SEPARATOR PROPERTIES

| PARAMETER | TARGET | Using $Al_2TiO_5$ | USING 3YSZ |
|---|---|---|---|
| MATERIAL | 100%$_w$ Ceramic | 100%$_w$ Ceramic | 100%$_w$ Ceramic |
| THICKNESS | 25 µm Fired | 160-368 µm dry; fired ≈ 132-195 µm | 110-163 µm dry; fired 102-59 µm |
| PORE SIZE | <1 µm: preferred <200 nm | 3-42 µm | 0.5-6 µm |
| POROSITY | ~40% | 6.5-40.8% | |
| MELT INTEGRITY | 150° C. | ≤1500° C. | ≥875° C. |
| CORROSION RESISTANCE | Better Than Commercial | Intact >89 days in 12N HCl. | |

TABLE 1-continued

COMPARISON OF CeRollS FORMULATIONS TO TARGET
LITHIUM BATTERY SEPARATOR PROPERTIES

| PARAMETER | TARGET | Using $Al_2TiO_5$ | USING 3YSZ |
|---|---|---|---|
| | Electrolytes & >1 wk without degradation in common electrolytes | Intact >54 days in thionyl chloride. Intact >19 days in sulfuryl chloride | |
| CHEMICAL STABILITY | 10-year shelf life | Need accelerated battery life testing-phase II | Need accelerated battery life testing-phase II |
| THERMAL OPERATING RANGE | −40 to +120° F. | −40 to >>120° F. | −40 to >>120° F. |
| THERMAL STABILITY | <5% shrinkage | (Calculated) $\alpha$a $Al_2TiO_5$ −0.05%; $\alpha$b $Al_2TiO_5$ −0.19%; $\alpha$c $Al_2TiO_5$ −0.35% | (Calculated) $\alpha$ 3YSZ 0.18%; |
| VOLUME RESISTIVITY (Ohm-cm) | $Al_2TiO_5$ | $Al_2TiO_5 > 5.4 \times 10^2$ | |
| ION PERMEABILITY TYPICAL ELECTROLYTES | Better than Conventional Celgard or ManniGlas | Better than Conventional Celgard or ManniGlas in a ferric-ferrous redox couple in aqueous electrolyte | |
| RESISTANT TO CORROSION BY OXYHALIDE ELECTROLYTES | Resistant to immersion in thionyl chloride and sulfuryl chloride | Resistant to immersion in thionyl chloride and sulfuryl chloride | Resistant to immersion in thionyl chloride and sulfuryl chloride |
| COST EFFICIENCY | Dependent on economy of scale | Dependent on economy of scale | Dependent on economy of scale |
| FLEXIBILITY | Able to wrap around 8 mm mandrel without breaking | Some flexibility ($\approx$25° on a bend test; to be improved in Phase II | |
| DECREASED MANUFACTURING COMPLEXITY- | Dependent on economy of scale | Dependent on economy of scale | Dependent on economy of scale |

CeRollS also exhibited good ion permeability when compared with the performance of commercial separators. Celgard showed $2.56 \times 10^{-19}$ $cm^2$/sec while ManniGlas showed ~$7.50 \times 10^{-16}$, $Al_2TiO_5$ (Sample 1) exhibited ~$1.16 \times 10^{-15}$, and $Al_2TiO_5$ (Sample 2) exhibited ~$1.75 \times 10^{-15}$ $cm^2$/sec. Sample 1 showed the best (most desirable) ion permeability.

Efforts also focused on developing a ceramic slip from both 3YSZ and $Al_2TiO_5$, casting the slip, successfully firing samples, and performing initial tests. To this end, applicant successfully developed slip formulations for tape casting nanoparticle $Al_2TiO_5$ and 3YSZ, designed and developed an all-ceramic separator material, fabricated 1.5 in.×1.5 in. samples, and successfully tested the ion permeability, corrosion resistance and resistivity of CeRollS.

Suitable conditions for low temperature press lamination for thicker and intrinsically pin hole free tapes were established. In addition, it was found that some improvements in strength can be obtained with longer firing times and higher firing temperature. Testing showed favorable high resistivity, good ion permeability, and good corrosion resistance. Based thereon this data indicates that a robust, flexible, all-ceramic LOHB battery separator that can be used in a broad range of battery applications can be produced.

Materials

Yttria Stabilized Zirconia (YSZ) and aluminum titanate powders, the raw materials for ceramic membrane separators, were obtained from two suppliers. Thionyl chloride and sulfuryl chloride (electrolytes for LOHBs) were used in corrosion testing of the ceramic membrane separators. Additional corrosive liquids, such as HCl and potassium hydroxide were used to fully characterize the ceramic membranes. Supplies such as mirror finish pressing platens, firing substrates to process the membrane separators were also used. Platinum working electrodes and custom glass test cells were used for ion permeability testing. Two commercially available separator materials (Celgard® and ManniGlas®) were used for comparative performance standards.

Fabricating Flexible, Fully Ceramic Separators

Figure 5A:
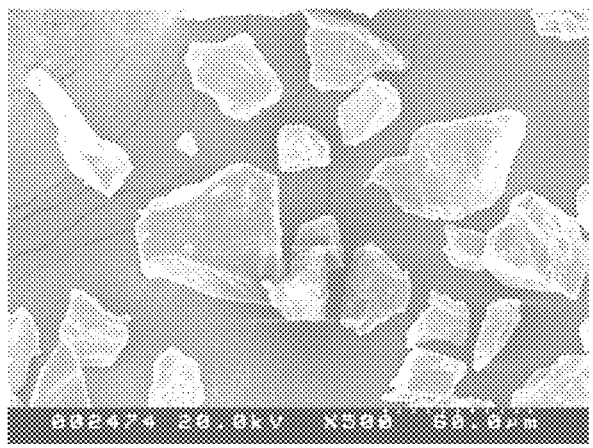
FIG. 5A. is a scanning electron microscopy (SEM) image of $Al_2TiO_5$ at low magnification (500×), showing no agglomerates.
Figure 5B:
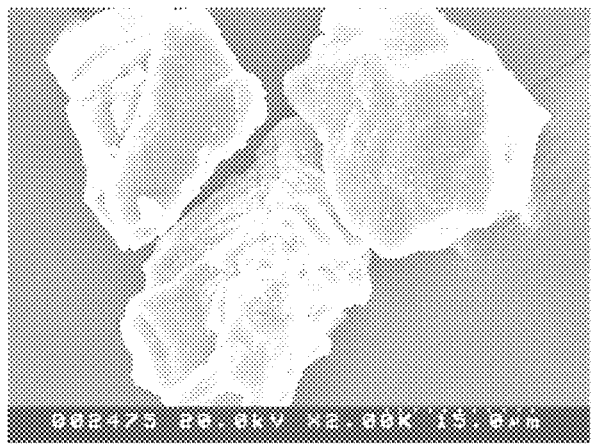
FIG. 5B is a scanning electron microscopy (SEM) image of $Al_2TiO_5$ at high magnification (2,000×) showing ultimate particle size of ~15-30 μm.
Figure 6A:
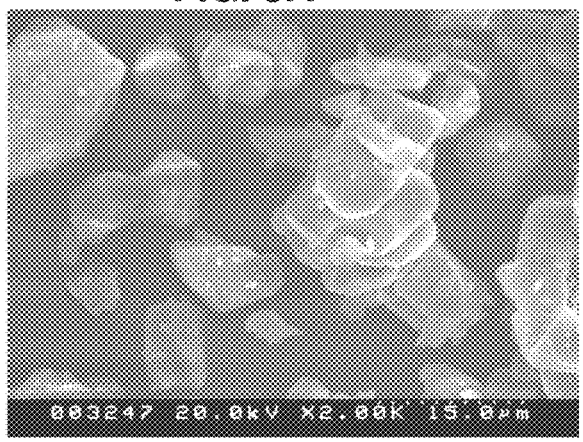
FIG. 6A is an SEM image of $Al_2TiO_5$ from a second source at a magnification of 2,000× which shows a few agglomerates.
Figure 6B:
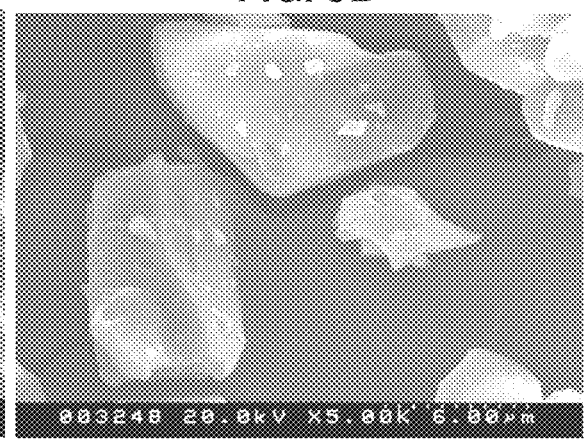
FIG. 6B is an SEM image of $Al_2TiO_5$ from the second source at a higher magnification (5,000×) showing ultimate particle size of ~5-20 μm.
Figure 7A:
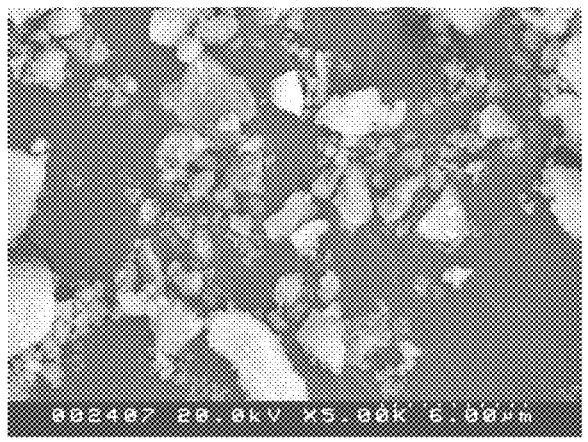
FIG. 7A. is an SEM image of 3YSZ at a first magnification (5,000×) showing agglomerates.
Figure 7B:
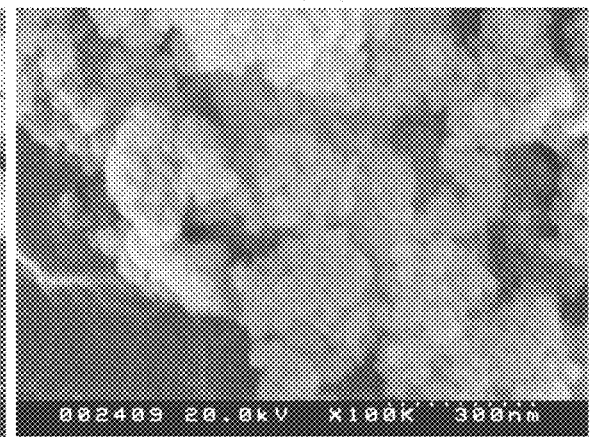
FIG. 7B is an SEM image of 3YSZ at a higher magnification (100,000×) showing particle sizes of ~40 nm.

Films were prepared from commercially available $Al_2TiO_5$ (two different sources) or 3YSZ following characterization using scanning electron microscopy (SEM, Photometrics, Huntington Beach, Calif.). The first source (Sigma Aldrich (SA)) had jagged particle size of ~15-30 μm (See FIGS. 5A and 5B). A second source of the $Al_2TiO_5$ powder (American Elements (AE)) is reported to be <325 mesh and 99% pure (metals basis) with a particle size at <44 μm. These two sources of $Al_2TiO_5$ sources allowed evaluation of two different particles sizes for forming the tapes. FIGS. 6A and 6B show $Al_2TiO_5$ from AE to have a jagged particle size at ~5-20 μm. FIGS. 7A and 7B show the 3YSZ powder to have large agglomerates of 1-10 μm, with an ultimate particle size of ~40 nm. Making films from nanopowder is often more challenging than making films from powders in the 1-10 μm particle size range.

Figure 8A:
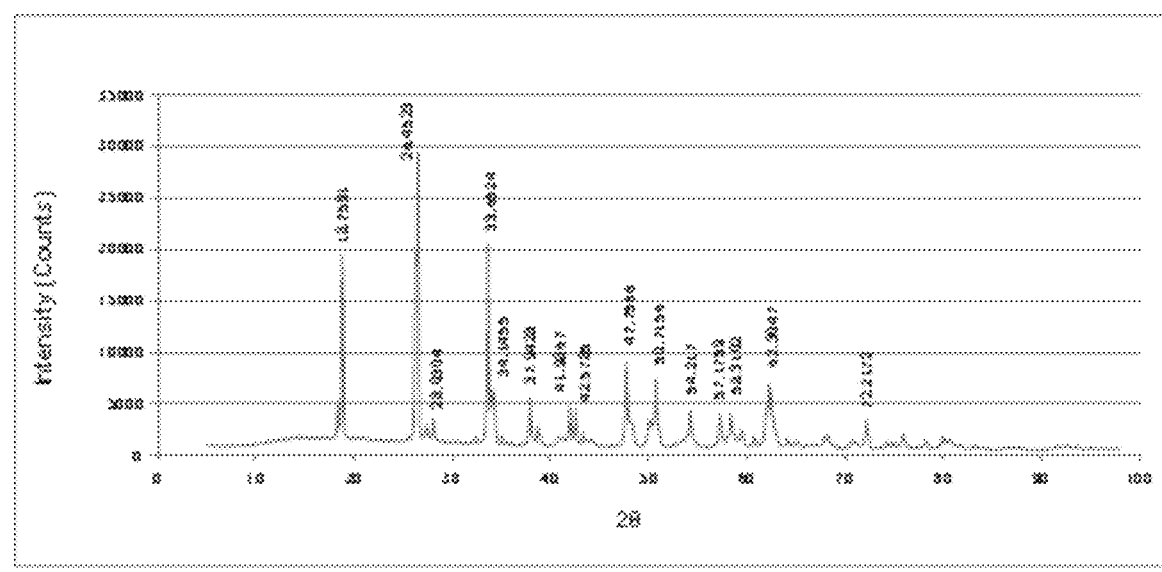
FIG. 8A shows the X-Ray diffraction spectrum for $Al_2TiO_5$ from a first source (SA).
Figure 8B:
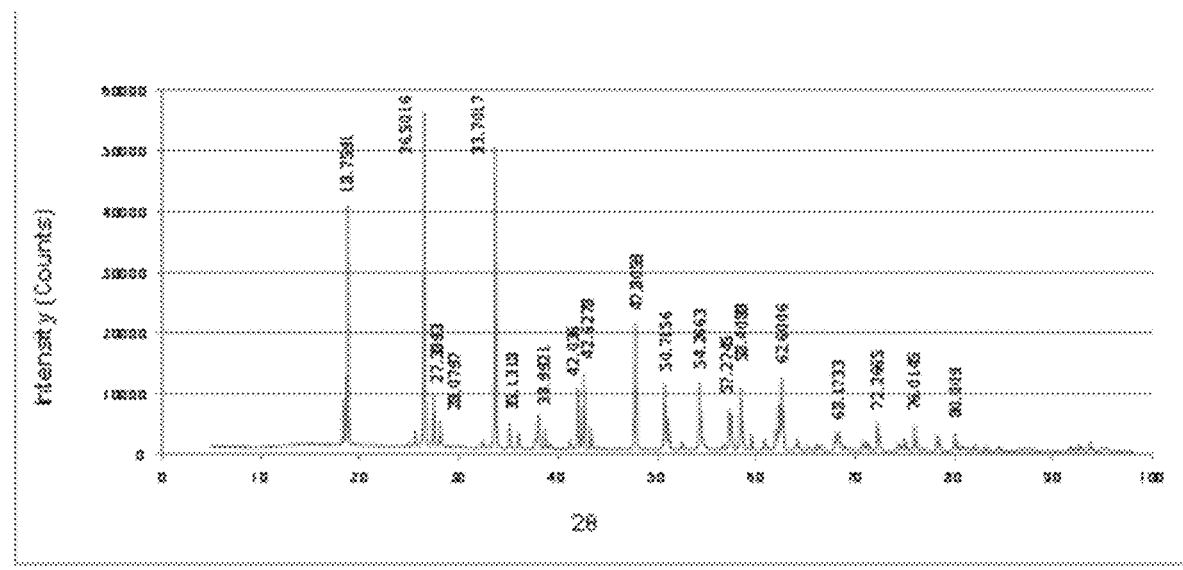
FIG. 8B shows the X-Ray diffraction spectrum for $Al_2TiO_5$ from a second source (AE). The spectra shown in FIGS. 8A and 8B are essentially the same. The major peaks correspond to the known $Al_2TiO_5$ d-spacing are 4.70, 3.35, 2.65, and 1.90.

FIGS. 8A and 8B show X-Ray Diffraction of the two different $Al_2TiO_5$ starting powders. $Al_2TiO_5$ is known to have an orthorhombic structure and is isomorphous with a pseudobrookite structure similar to ($Fe_2TiO_5$). The d-spacings are a function of impurities, and also may be modified by stresses that build up in $Al_2TiO_5$ due to processing and the intrinsic structure of the phase. The Al$_2$TiO$_5$ has average d-spacings of 4.70, 3.35, 2.65, and 1.90). (Ogunwumi, S B and Tepesch, P D; "Ceramic Body Based On Aluminum Titanate and Including a Glass Phase"; United States; Patent Application Publication; US 2006/0064957 Pub. Date: Mar. 30, 2006).

The black color of the AE Al$_2$TiO$_5$ sample and the white color of the SA Al$_2$TiO$_5$ are in stark contrast. However, after firing the color of the AE sample became an off white. The effect is presumed to be caused by lattice oxygen deficiency. On firing in air, the lattice takes on more oxygen to produce the lighter off-white color. However, both are Al$_2$TiO$_{(5-x)}$, where x is variable based on synthesis method and firing profile of the final material.

Figure 9A:
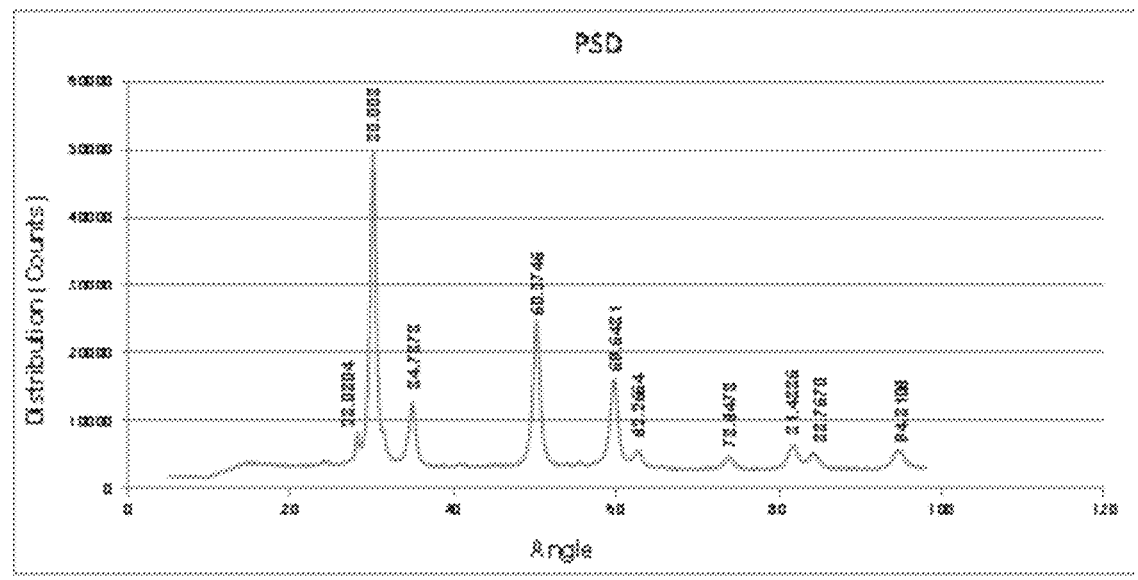
FIG. 9A shows the X-Ray diffraction pattern for the 3YSZ used herein.
Figure 9B:
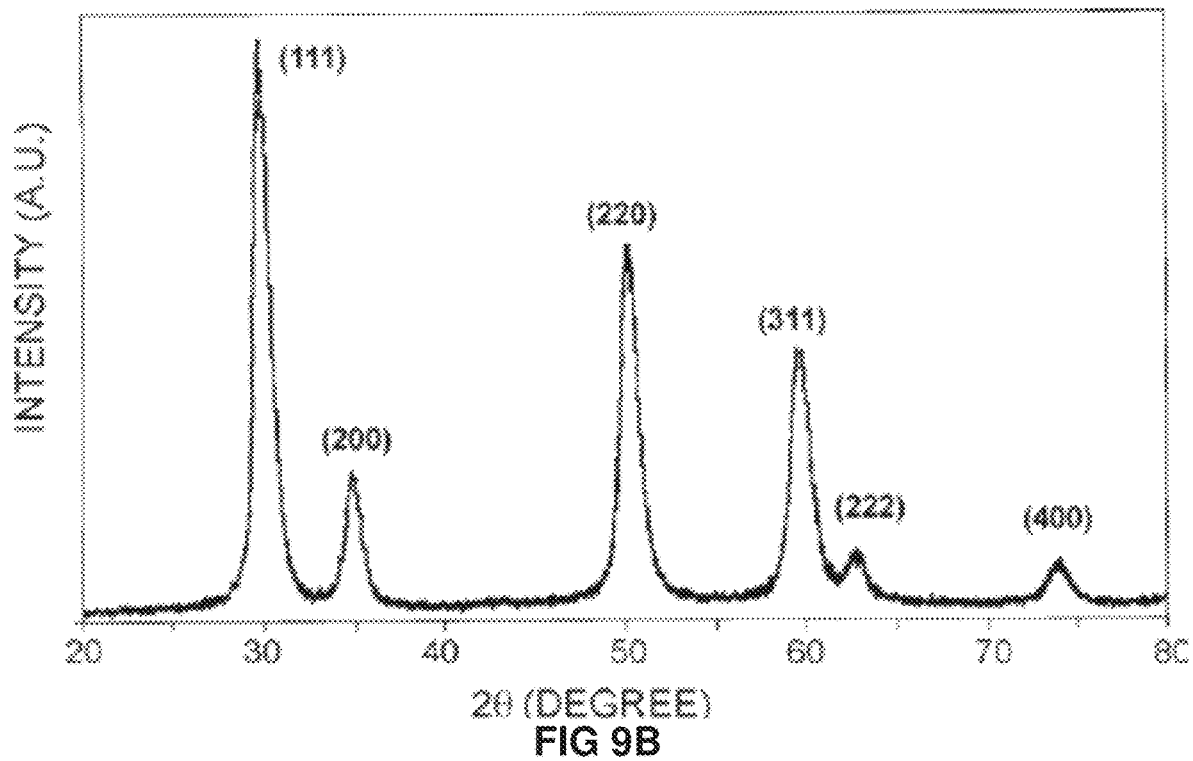
FIG. 9B shows a literature scan for 3YSZ., this pattern being in close agreement for the major peaks with FIG. 9A.
Figure 10A:
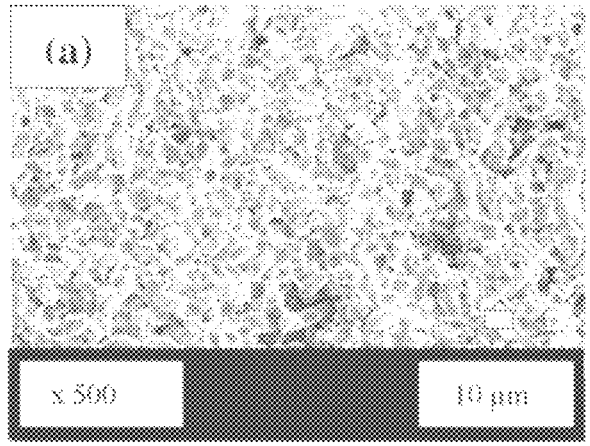
Figure 10B:
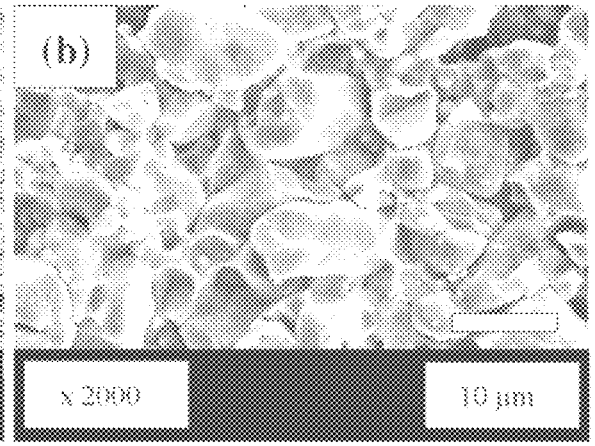
Figure 10C:
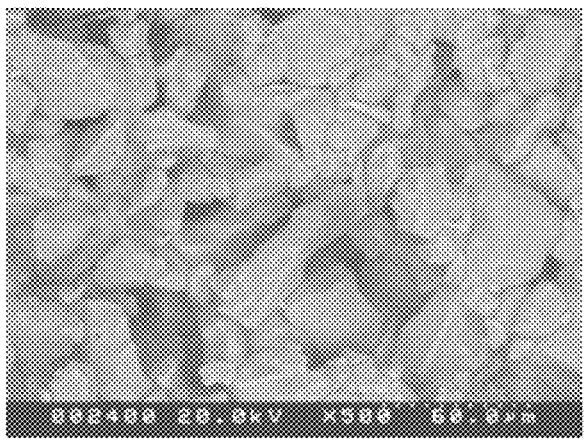
FIGS. 10C and 10D show the $Al_2TiO_5$ powders used herein.
Figure 10D:
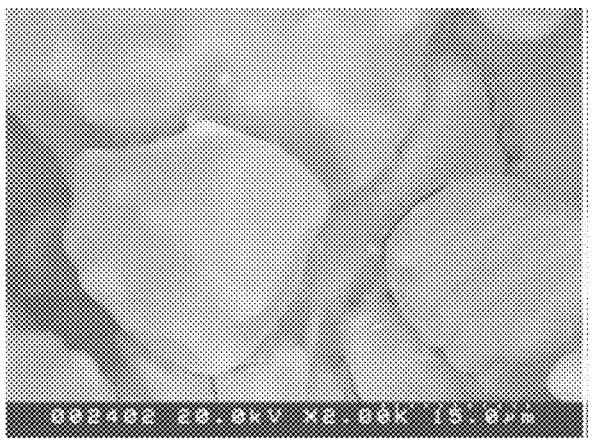

An X-Ray diffraction pattern shown in FIG. 9A was also generated for the 3YSZ. The major peaks are in close agreement with the spectrum shown in the literature. (FIG. 9B; Patil D S; Prabhakaran K; Durgaprasad C; Sharma, S C; "Synthesis Of Nanocrystalline 8 Mol % Yttria Stabilized Zirconia By The Oleate Complex Route; *Ceramics International*, January 2009, 35 (1); p 515-519)

Fabricating Ceramic Separators—Al$_2$TiO$_5$

Disks and tape were both cast from Al$_2$TiO$_5$. The technical literature discusses the flexibility property of fired, pressed pellets of ceramic Al$_2$TiO$_5$. Described herein are the formation of disks of Al$_2$TiO$_5$ to evaluate flexibility. Evaluated were the optimum firing cycle and limits on thickness to be applied in casting tape samples. The resultant properties were compared to data in the literature. (Halford G. R.; "Fatigue and Durability of Structural Materials of Structural Materials"; *ASM International*, 2006, p 405). Al$_2$TiO$_5$ formulations were adjusted to achieve easy casting into tape, good crack-free drying, and crack-free firing.

Initial disk samples were formed using the Al$_2$TiO$_5$ powder without any added vehicle. However, after pressing the edges of the disk fell away. Therefore, a formulation was then made using several alternative fugitive organic vehicles/binders (Edge-Tech Industries LLC. YSZ (Yttria Stabilized Zirconia). URL:http://www.edgetechind.com/Products/Refractory-Metals/Zirconium/Chemicals/YSZ-Yttria-Stabilized-Zirconia-719-1.html). Fractured cross sections of the Al$_2$TiO$_5$ disks were examined using SEM (Photometrics). The grain morphology was the same in both the literature and samples prepared (FIGS. 10A-10D). However, the grain size of the samples prepared had a grain size 4× that shown in the literature. Also, while disks produced were not pressed at high pressures and a good binder had not yet been identified, the binder used in tape casting was found to be more effective and tape pressing was then accomplished using higher pressures and temperatures to provide suitable lamination in the cast tape samples.

Figures 11A, 11B, 11C:
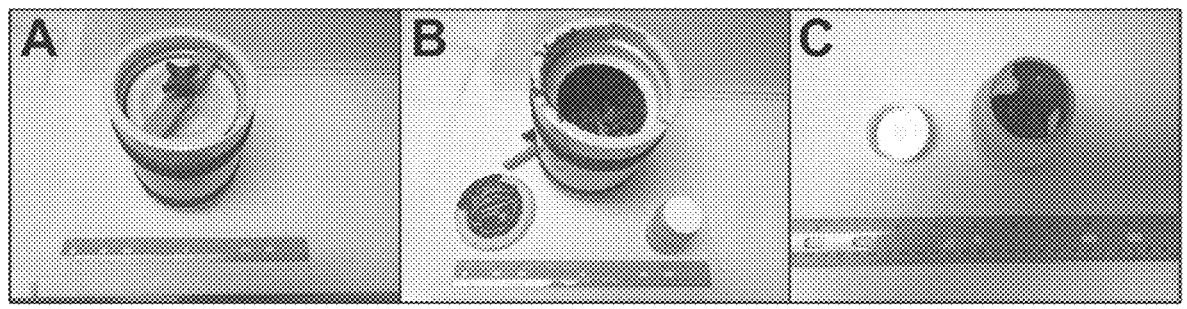
FIG. 11A shows the ball mill jar used for milling the $Al_2TiO_5$ to obtain the desired microstructure for a tape slip.
FIG. 11B shows the ball mill jar after milling the $Al_2TiO_5$ for prepare tape casting slip.
FIG. 11C shows the final container containing the initial tape casting material (Referred to as "slip.")
Figure 12A:
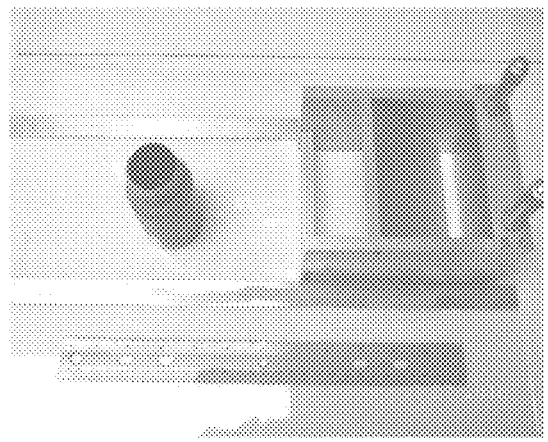
FIG. 12A shows a commercial small-scale tape casting head, $Al_2TiO_5$ milled slip in a de-airing jar bottle, and glass substrate with casting guide rails.
Figure 12B:
FIG. 12B shows a wet cast tape sample illustrating that some of the initial 14 formulations had issues with cast uniformity.

Tape Casting of Al$_2$TiO$_5$—The initial pressed sample sizes were kept small, to allow evaluation of numerous different formulations while consuming as little material as possible in order to identify a material composition having acceptable flow characteristic. FIG. 11A-11C show, respectively, the ball mill, the powdered sample in the ball jar, and the sample produced. The initial formulation appeared to have good flow characteristics for tape casting. The material was de-aired prior to casting. While cosmetic flaws, such as thin areas were present, fired dried tape was formed to obtain initial information on thickness and fired flexibility.

Figure 13A:
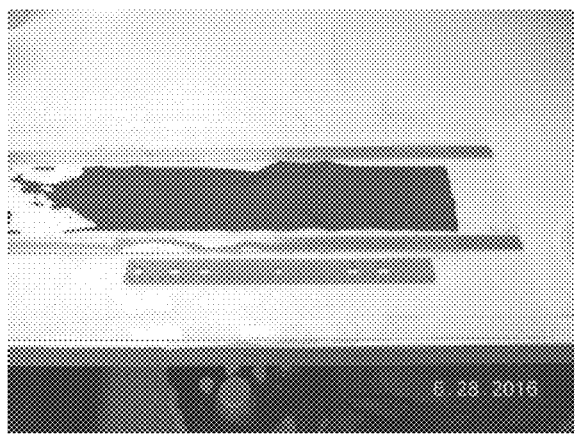
FIG. 13A shows a dried $Al_2TiO_5$ tape (Sample 062016RW3091-2).
Figure 13B:
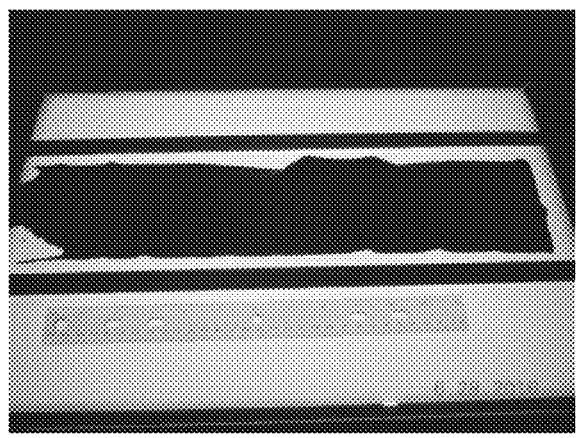
FIG. 13B shows an improved dried tape placed on a light box for inspection for pinholes. The tape is smooth and without any large pinholes.

FIGS. 13A and 13B show an improved composite Al$_2$TiO$_5$ tape resting on a light box. FIG. 13A shows the dried Al$_2$TiO$_5$ tape (Sample 062016RW3091-2) in ambient light. FIG. 13B shows the use of the light box for inspecting the dried tape for pinholes. The tape was smooth and without any large pinholes. However, about a dozen small pinholes («1 mm) were visible using a magnifying glass.

Several samples of the Al$_2$TiO$_5$ tape were prepared, including a single unpressed tape, a pressed two-layer tape and a pressed three-layer tape sample. Pressing was performed at a nominal 3 Klb at 52±1° C. (125±2° F.). The nominal initial size was ½ in.×1 in. in all three cases, with thicknesses from 0.18 to 0.40 mm (See Table 2).

TABLE 2

| Tape Thickness (mm) | 1 Layer (unpressed) | 2 Layer (pressed) | 3 Layer (pressed) |
|---|---|---|---|
| Average | 0.18 | 0.28 | 0.40 |
| Standard deviation | 0.01 | 0.03 | 0.02 |

Figure 14A:
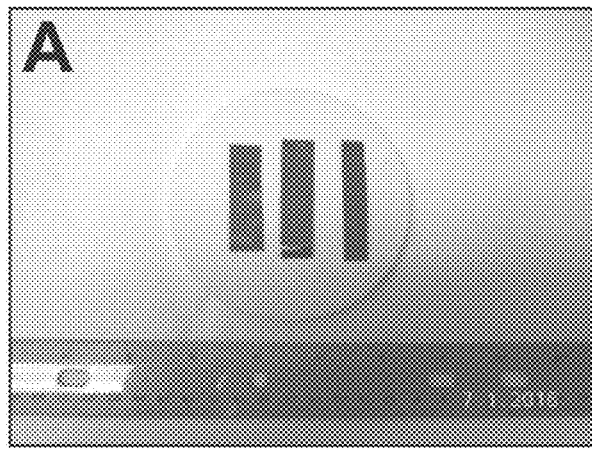
FIGS. 14A and 14B show three strips of 062016RW3092-2 ($Al_2TiO_5$) tape. The Figures show 1 layer with no pressing, 2 pressed layers, and 3 pressed layers respectively. Samples in 14A are unfired and in 14B are fired at 1500° C. for 8 hours.
Figure 14B:
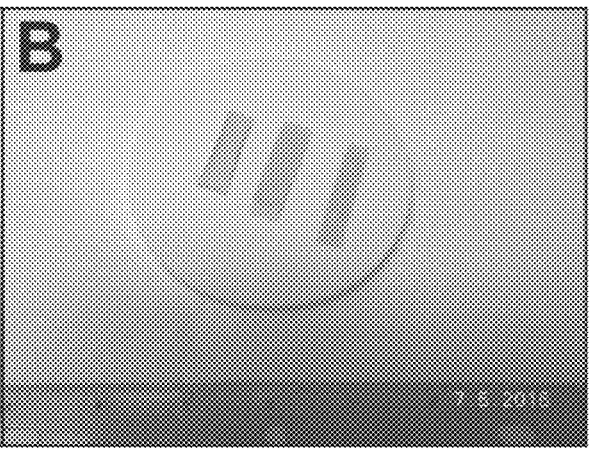

The samples were then fired at 1500° C. The unfired samples are shown on an alumina substrate in FIG. 14A; the fired samples are shown on the same alumina substrate in FIG. 14B. The black color of the initial Al$_2$TiO$_5$ is due to a stoichiometric deficiency of oxygen. After firing in air, the dark color is substantially eliminated, as evidenced by a lighter coloration for the fired samples. The fired product was continuous and did not degrade to a powder on firing at 1500° C. for 8 hours. Further, they were easily removed from the substrate as there was no adhesion to the substrate after firing. The fired tapes did not, however, exhibit as much flexibility as desired (wrapping 270° around an 8 mm mandrel). The fired tape thicknesses were subsequently measured using a caliper micrometer. Subsequent samples prepared at higher temperatures and longer firing times appeared to improve flexibility of the end product.

Al$_2$TiO$_5$ (Sample 072716RW3091-1)—These samples were prepared using the Al$_2$TiO$_5$ powder obtained from SA. Initially, some separation of the powder from the binder was observed when the material was allowed to sit for several days before firing. However, the material was usable following processing on a roll mill, which is a technique that is used in some tape casting monolithic capacitor production facilities. When scaled up to four times the size of the original, the formulation appears to have good flow characteristics for tape casting.

Figures 15A, 15B, 15C:
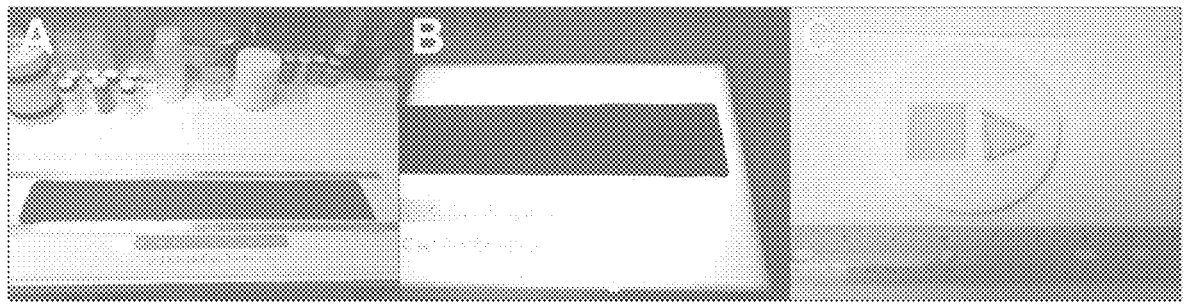
FIGS. 15A, 15B and 15C show Al$_2$TiO$_5$, formulation 072716RW3091-1 where 15A is as cast.
Figures 16A, 16B, 16C:
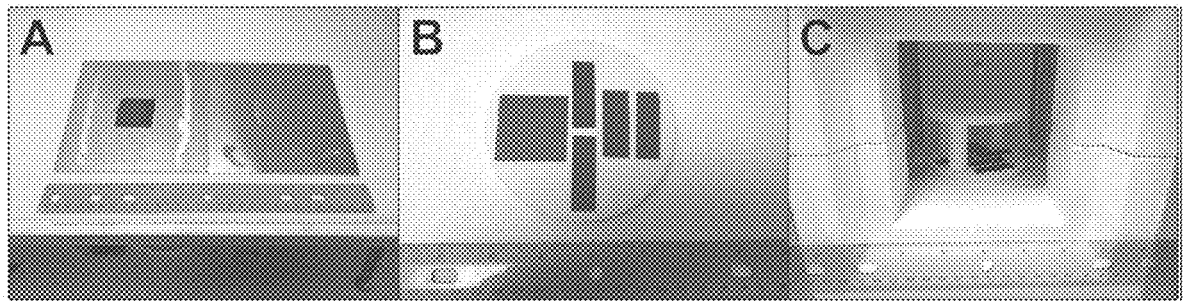
FIGS. 16A, 16B and 16C show Al$_2$TiO$_5$, formulation 072716RW3091-1 after a second batch of firing where 16A is a sample pressed in a Carver press at room temperature to form a laminate of 4 layers; 16B shows samples of a large laminate and four single layers of 1.5 in.×0.5 in. samples on a Zirconia substrate for firing and 16C shows samples in the furnace ready for firing at 875° C.

The Al$_2$TiO$_5$ material was cast to a thin dried layer 230 μm (0.23 mm) thick. Four (4) fired samples, one of which is shown in FIG. 15, as well as an additional five (5) samples (FIG. 16) were produced. The Al$_2$TiO$_5$ tape samples were fired with a 16 h cool down which provided time for improved structural development and flexibility, the result being one acceptable tape and one badly curled tape.

Al$_2$TiO$_5$ (Sample 080916RW3091-1):—These samples were prepared using the Al$_2$TiO$_5$ powder obtained from AE. The sample sizes were again deliberately kept small until suitable flow characteristics were established. This formulation was cast easily and had the desired viscoelastic properties typical of a good casting material. A larger batch was later used for casting tapes.

Fabricate Ceramic Separators—3YSZ

Figure 17A:
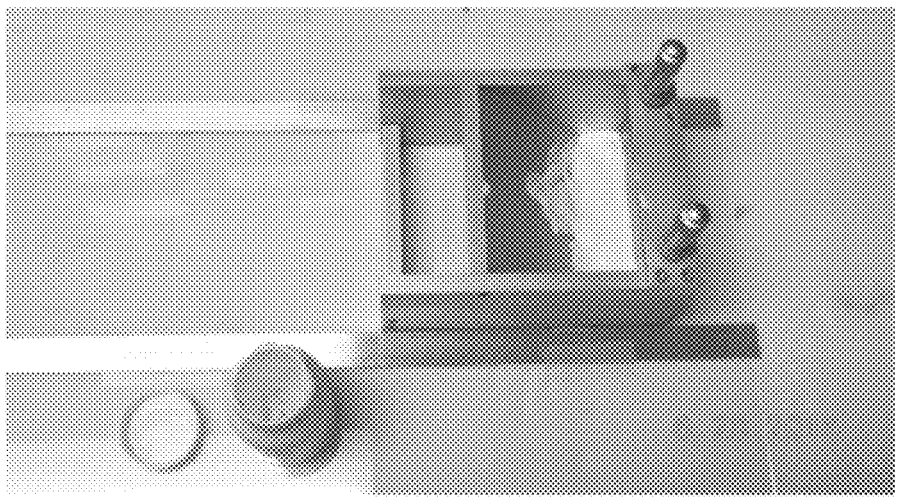
FIG. 17A shows a commercial small-scale tape casting head, 3YSZ films in a bottle, and a glass substrate with casting guide rails.
Figure 17B:
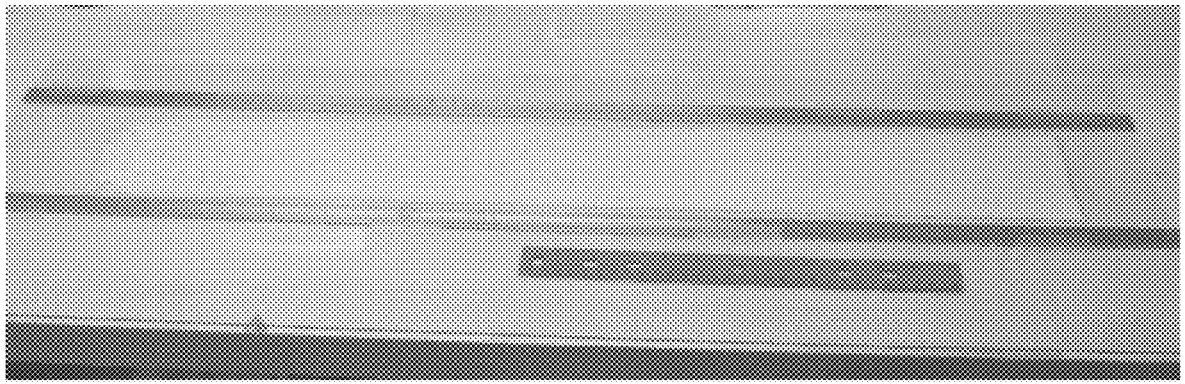
FIG. 17B shows a wet cast 3YSZ tape.

Several tape samples were cast from nanopowder 3YSZ. FIG. 17A shows a manual commercial tape casting head used to prepare the tapes, the 3YSZ slip in a de-airing jar, and a sample of a cast tape on a glass substrate.

Figure 18:
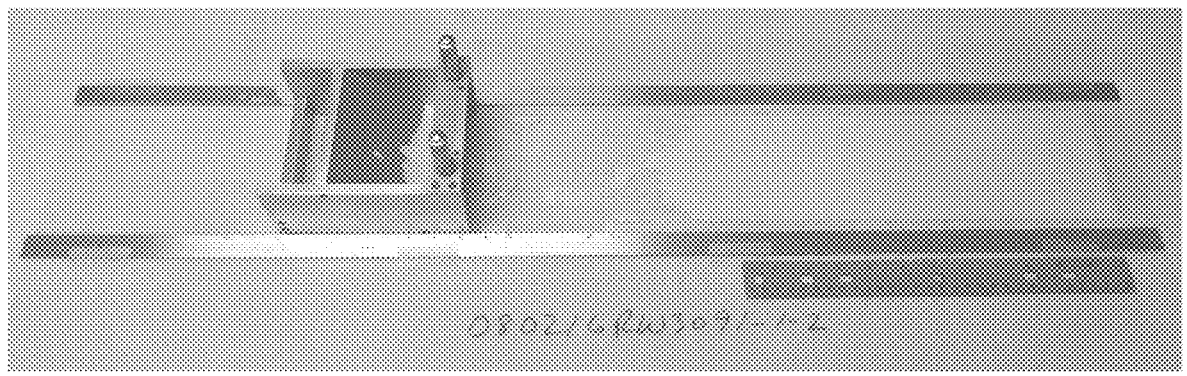
FIG. 18 shows a wet cast 3YSZ sample 080216RW3091-1 tape.

3YSZ (Sample 080216RW3091-1)—Tapes of 3YSZ were successfully cast from a formulation comprising the powdered 3YSZ material. The film was then placed on a graphite substrate and fired in a nitrogen atmosphere. The 3YSZ material had a high viscosity but was stable and showed no separation of constituents after de-airing and standing following de-airing. It was cast successfully to form a 3YSZ tape. Samples were then cut from the tape and fired both as single and pressed multiple layers for various different time periods. The tape, shown in FIG. 18, shows some irregularities but no thin or open areas were seen for previously.

Figures 19A, 19B, 19C:
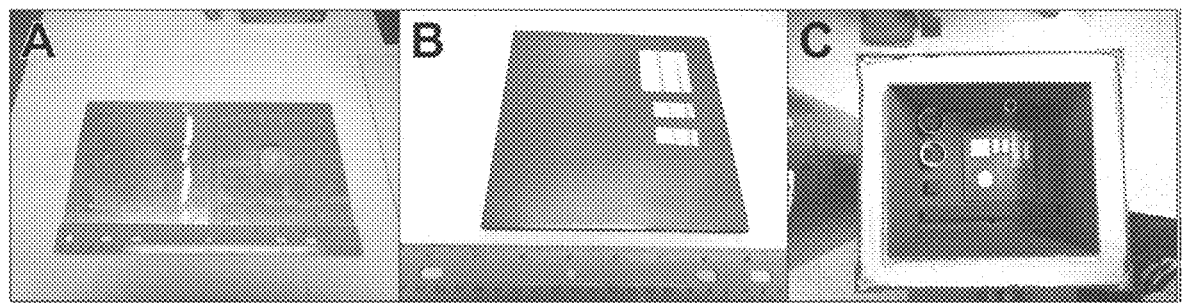
FIG. 19A-19C show a 3YSZ (080216RW3091-1) where 19A is al 0.5 in.×1.5 in. sample of 3 layers (cracked) and 19B shows sample of 19A folded into quarters and re-pressed. Several 3YSZ single layer samples were then loaded onto a graphite substrate. 19C shows the retort used for N$_2$ firing containing the repressed sample, five (5) single layer 1.5 in.×1.5 in. samples, two 1 in.×0.5 in., and two 1.5 in.×0.5 in. samples pressed on the lubricious graphite substrate.

Additional samples were cut from the same 3YSZ tape (Sample 080216RW3091-1). A 1.5 in.×1.5 in. sample was laminated to produce a 3 layer. The tape cracked in the center of the piece in the green state (prior to firing) so the piece was turned and folded into quarters, and re-pressed (FIG. 19). To produce additional usable samples, additional 3YSZ single layer pieces were loaded onto a pressed, lubricious, hard graphite substrate including one 1.5 in.×1.5 in. piece, two 1 in.×0.5 in. pieces and two 1.5 in.×0.5 in. pieces. (FIGS. 19B and 19C).

Graphite Substrates

The lubricious graphite substrate provides a better surface which eliminates adhesion of the sample onto the surface during firing. The lubricious graphite also appears to provide a better substrate for preventing curling during the drying process. Thicker (0.25 in.) load plaques were also fired, but resulted in complete cracking of all the parts. All the samples showed some degree of curling after firing.

Figures 20A, 20B, 20C:
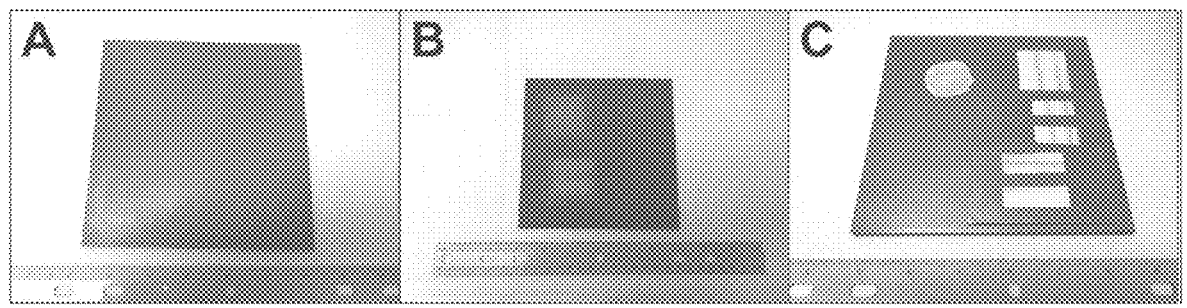
FIG. 20A-20C show the conductive graphite plates: (A) showing a freshly polished surface; (B) showing surface changes after firing; and (C) showing samples ready to be fired on top of the lubricious compressible graphite sheet.

The 3YSZ samples were fired on top of a smooth graphite surface. In order to prevent the graphite from oxidizing, the samples were fired in a retort with flowing nitrogen. The polished graphite substrate surface is shown in FIG. 20A. During the firing, the high temperature, conductive, premium sheet, ¼" thick, 6"×6" graphite surface under each sample became modified (FIG. 20B), so the surface was repolished before each use (FIG. 20C). By repolishing after each use, these ¼ inch thick graphite substrates can be used for many subsequent firings.

As an alternative, the use of a thinner (1/16-inch thick) lubricious compressible graphite sheet was considered. However, while the thinner sheet was found to be more difficult to clean, it did not tend to acquire a rough surface after each firing.

Comparison of $Al_2TiO_5$ and 3YSZ Tapes and Fired Parts

The thickness of a cast tape after drying was found to be a function of the casting formulation, the gap on the casting device, room temperature and relative humidity during casting, and casting speed. However, while the thickness of the dried, cast film is relevant to the final fired thickness, other parameters are also relevant in determining fired thickness. All tapes were cast using a manual casting production head. However, an automated casting machines will perform the same process with greater uniformity than manual casting. To demonstrate the range of dried cast thicknesses that could be achieved, the thickness was measured using a caliper micrometer. Table 3 shows that the thickness measured for various dried tapes ranging from 0.11 to 0.37 mm

TABLE 3

RANGE OF THICKNESSES (MM) ACHIEVABLE FOR UNFIRED CAST DRIED FOR MDA TAPE SEPARATOR PRECURSOR MATERIAL

| $Al_2TiO_5$ Vendor 1 | $Al_2TiO_5$ Vendor 1 Scaleup | $Al_2TiO_5$ Vendor 2 | $Al_2TiO_5$ Vendor 2 | 3YSZ Vendor 1 | 3YSZ Vendor 1 |
|---|---|---|---|---|---|
| 062016R W3091-2 Unfired | 072716R W3091-1 Unfired 8-20-16 | 080916R W3091-1 Unfired 9-8-16 | 080916R W3091-1 Unfired | 062016R W3091-1 Unfired | 080216R W3091-1 Unfired |
| 0.150 | 0.290 | 0.340 | 0.380 | 0.178 | 0.140 |
| 0.160 | 0.310 | 0.330 | 0.330 | 0.178 | 0.130 |
| 0.150 | 0.180 | 0.390 | 0.300 | 0.102 | 0.090 |
| 0.170 | 0.190 | 0.390 | 0.380 | 0.203 | 0.090 |
| 0.170 | 0.200 | 0.390 | 0.310 | 0.152 | 0.100 |
| STANDARD DEVIATION | | | | | |
| 0.010 | 0.061 | 0.030 | 0.038 | 0.038 | 0.023 |

Fired Tape Thicknesses—Apparent Densities

The thickness, width, and length of each unfired sample was measured three times and the thickness, width and length of each fired tape was measured five (5) times using a caliper micrometer. The samples were also weighed and the data was used to determine apparent density. Using $$\rho_{app} = (\rho Al_2TiO_5 - \rho\ Sample)/\rho Al_2TiO_5$$

the apparent porosity (ρapp) of the $Al_2TiO_5$ tape was then calculated, assuming that the density of pure $Al_2TiO_5$ is 3.35 g/cm³. The theoretical density of bulk $Al_2TiO_5$ was used to calculate the apparent densities of the tapes. Note the average thickness (thAV) in Table 4 is the average of three thickness readings for samples. As shown in Table 4, the apparent porosity for the first firing was ~40-50% while the second firing resulted in apparent densities of ~33-36%. Subsequent firings provided apparent densities of ~12-40%. While the reasons for the range of values is unclear, curling of many substrates made it difficult to obtain consistent values.

Fired Tape—Microstructure: $Al_2TiO_5$ $Al_2TiO_5$ (Sample 062016RW3091-1) tapes were successfully produced and, with practice, could be handled. Tapes were cut, in some instances laminated at pressure and low temperature, and then firing at 1500° C.

Figure 21A:
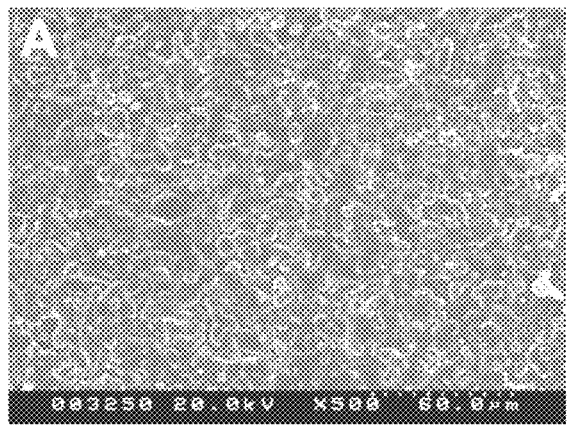
FIGS. 21A-21D show an Al$_2$TiO$_5$ sample (sample 062016RW3091-1F1500-04) where
Figure 21B:
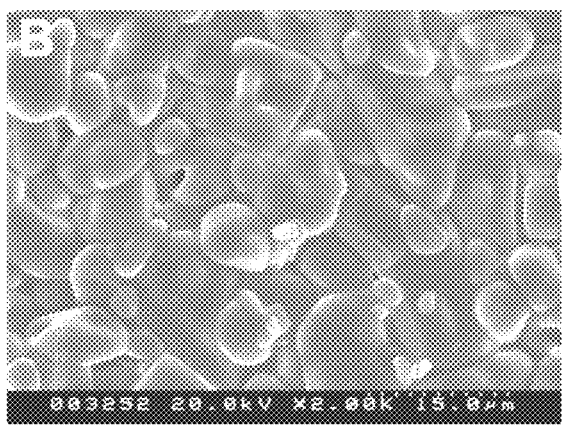
Figure 21C:
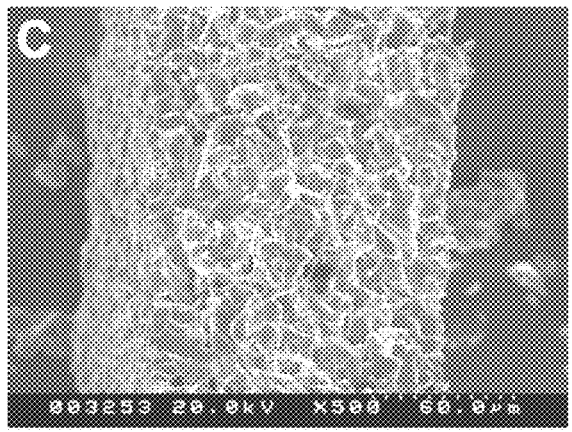
Figure 21D:
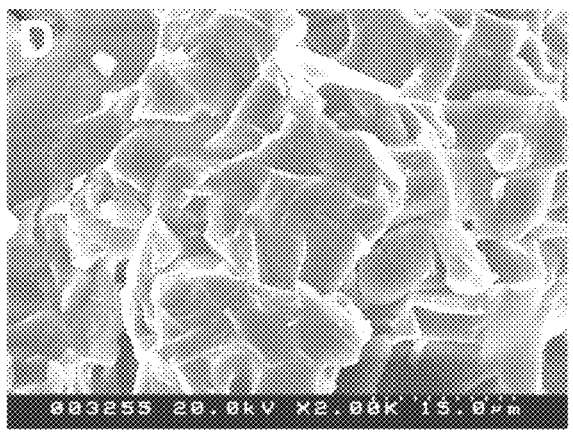
Figure 22A:
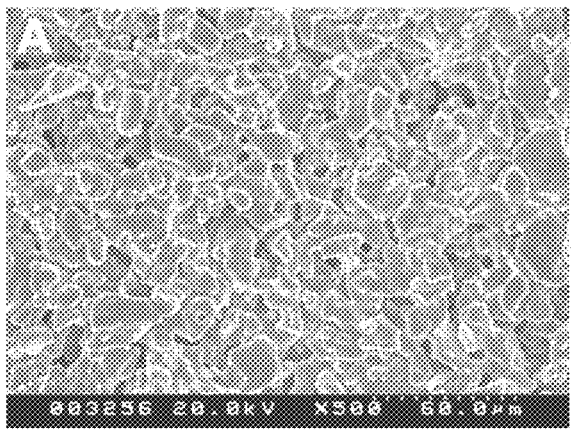
FIGS. 22A-22D show a fired Al$_2$TiO$_5$ sample (Sample 072716RW3091-1-1) where
Figure 22B:
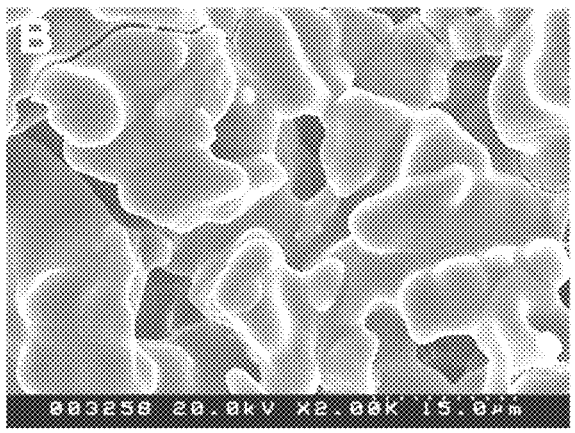
Figure 22C:
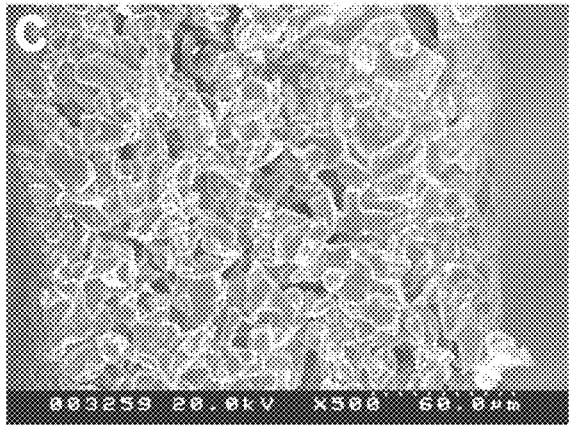
Figure 22D:
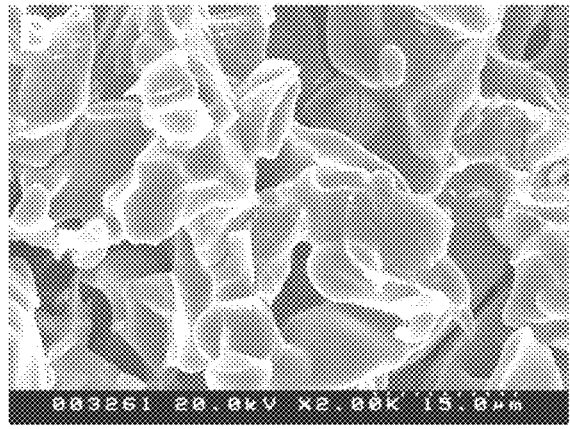
Figure 23A:
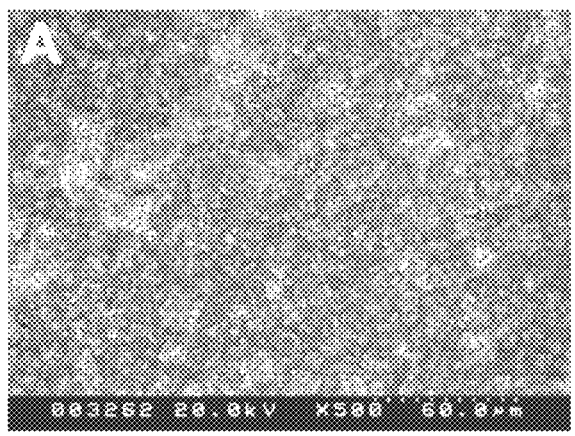
FIGS. 23A-23D show a fired 3YSZ sample (Sample 080216RW3091-1-10-01) where
Figure 23B:
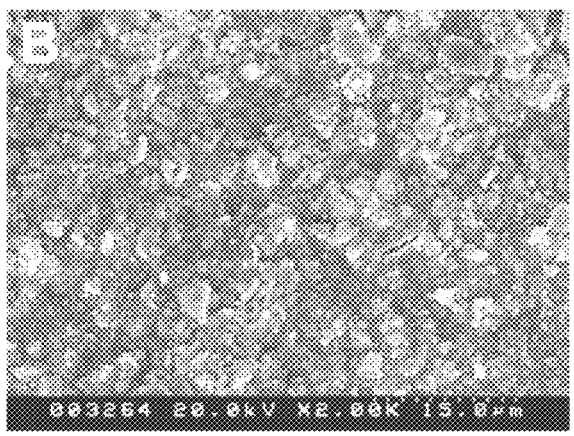
Figure 23C:
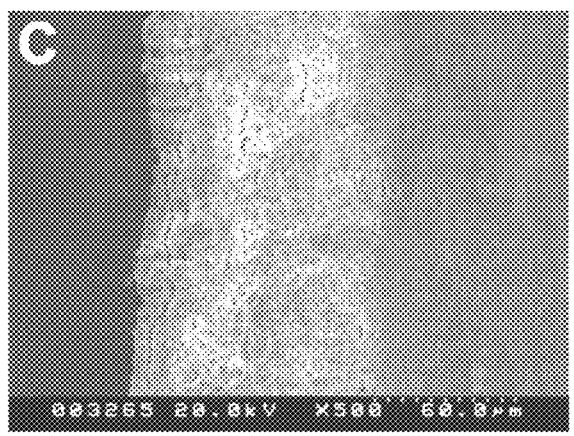
Figure 23D:
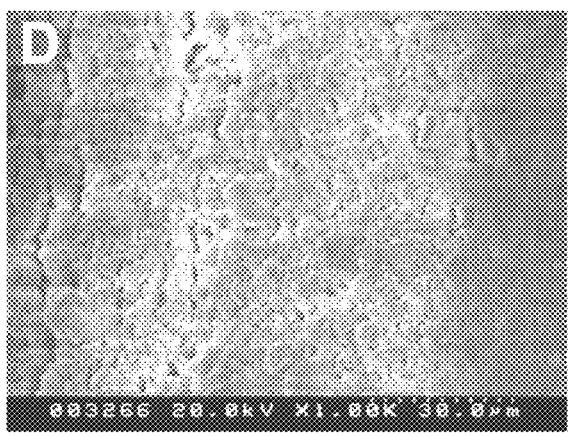

FIGS. 21A-D show SEM images of representative samples of fired $Al_2TiO_5$. As shown in FIGS. 21A and 21B the surfaces of the tapes appear to be well sintered. In cross section (FIGS. 21C and 21D), they also appear well sintered, with no microscopic delamination but exhibit microcracking characteristic of flexible $Al_2TiO_5$. This microcracking seen the upper FIGS. 21A and 21B compares well with examples from the literature. (Babalot C.; Guignard A.; Huger M.; Gault C.; Chotard T.; Ota, T.; Adachi, N.; "Preparation and Thermochemical Characterization Of Aluminum Titanate Flexible Ceramics". *Journal of Material Science*, 2011. 46, p 1211-1219).

TABLE 4

DENSITIES OF FIRED $AL_2TIO_5$ TAPE SAMPLES

| Material | SAMPLE | Layers | Size | thAV | Density g/cm³ | Porosity |
|---|---|---|---|---|---|---|
| $Al_2TiO_5$ | 070516RW3091-2 | 1 | 0.5 × 1.5 | 0.023 | 1.696 | 0.494 |
| $Al_2TiO_5$ | 070516RW3091-2 | 2 | 0.5 × 1.5 | 0.026 | 2.126 | 0.365 |
| $Al_2TiO_5$ | 070516RW3091-2 | 3 | 0.5 × 1.5 | 0.041 | 1.980 | 0.409 |
| $Al_2TiO_5$ | 071516RW3091-1 | 1 | 0.5 × 1.5 | 0.014 | 2.639 | 0.212 |
| $Al_2TiO_5$ | 071516RW3091-1 | 2 | 0.5 × 1.5 | 0.019 | 2.814 | 0.160 |
| $Al_2TiO_5$ | 071516RW3091-1 | 3 | 0.5 × 1.5 | 0.024 | 3.131 | 0.065 |
| $Al_2TiO_5$ | 062016RW3091-2-1 | 1 | 0.5 × 1.5 | 0.012 | 3.133 | 0.065 |

TABLE 4-continued

DENSITIES OF FIRED AL$_2$TIO$_5$ TAPE SAMPLES

| Material | SAMPLE | Layers | Size | thAV | Density g/cm$^3$ | Porosity |
|---|---|---|---|---|---|---|
| Al$_2$TiO$_5$ | 062016RW3091-2-8 | 1 | 0.5 × 1.5 | 0.016 | 2.384 | 0.288 |
| Al$_2$TiO$_5$ | 062016RW3091-2-9 | 1 | 0.5 × 1.5 | 0.015 | 2.454 | 0.268 |
| Al$_2$TiO$_5$ | 062016RW3091-2-10 | 1 | 0.5 × 1.5 | 0.013 | 2.960 | 0.116 |
| Al$_2$TiO$_5$ | 062016RW3091-2-11 | 1 | 0.5 × 1.5 | 0.016 | 2.206 | 0.341 |
| Al$_2$TiO$_5$ | 062016RW3091-2-12 | 1 | 0.5 × 1.5 | 0.014 | 2.622 | 0.217 |
| Al$_2$TiO$_5$ | 062016RW3091-2-13 | 1 | 0.5 × 1.5 | 0.019 | 1.982 | 0.408 |
| Al$_2$TiO$_5$ | 062016RW3091-2-14 | 1 | 0.5 × 1.5 | 0.013 | 2.747 | 0.180 |
| Al$_2$TiO$_5$ | 062016RW3091-2-15 | 1 | 0.5 × 1.5 | 0.013 | 2.742 | 0.182 |
| Al$_2$TiO$_5$ | 062016RW3091-2-16 | 1 | 0.5 × 1.5 | 0.013 | 2.871 | 0.143 |

Al$_2$TiO$_5$ (Sample 072716RW3091-1-1) tapes were also successfully produced. Tapes were cut, and in some cases laminated under pressure and low temperature, and then fired at 1500° C. They also could be manipulated if handled carefully. FIGS. 22A-22D show SEM images of representative samples of fired Al$_2$TiO$_5$. On the surface (FIGS. 22A and 22B), and in cross section (FIGS. 22C and 22D) also appear well sintered with no microscopic delamination, but high porosity and microcracking characteristic of flexible Al$_2$TiO$_5$ was observed.

Fired Tape—Microstructure: 3YSZ

3YSZ tapes were also fabricated successfully but were relatively thin. Tapes were cut, and in some cases laminated at pressure and low temperature, followed by firing at 850-875° C. However, they were friable and difficult to handle. FIGS. 23A-23D show SEM images of selective, representative fired samples of 3YSZ tapes. On the surface (FIGS. 23A and 23B), appear well sintered. However, in cross sections (FIGS. 23C and 23D), they show microscopic delamination which was not evident macroscopically. The friability can be attributed, at least in part, to the minor delamination. Fired thicknesses were initially measured using a handheld caliper micrometer. However, it was found that more accurate measurements could be determined by SEM fracture cross sections.

The cross sections (FIGS. 21A-21D, 22A-22D and 23A-23D) were used to determine the fired thickness and the pore size. These are summarized in Table 5. The fired thicknesses for these various samples are comparable. Thickness can be increased by laminating multiple layers. Caliper micrometer measurements include some camber, and are therefore greater in value to a maximum of about 380 μm. Pore size varies as a function of formulation, laminating time and temperature, and firing temperature profiles. Further modification of the pore size can be obtained by use of suitable porogens.

TABLE 5

FIRED AL$_2$TIO$_5$ AND 3YSZ TAPE SAMPLE CHARACTERISTICS FROM SEM

| Material | Sample ID | Thickness (μm) | Pore Size (μm) |
|---|---|---|---|
| Al$_2$TiO$_5$ | 062016RW3091-1-F1500 | 132 | 3-9 |
| Al$_2$TiO$_5$ | 072716RW3091-1 | 195 | 6-42 |
| 3YSZ | 080216RW3091-1-10 | ~102-159 | 0.5-6 |

Evaluating Thermal Expansion, Resistance to Corrosion from LOHB Electrolytes, Electrical Insulation, and Ion Permeability of CeRollS Thermal Expansion The thermal expansion coefficients for the two candidate materials are as follows:

3YSZ $\alpha=11\times10^{-6}/°$ C.

(EdgeTech Industries LLC. YSZ (Yttria Stabilized Zirconia).

URL:http://www.edgetechind.com/Products/Refractory-Metals/Zirconium/Chemicals/YSZ-Yttria-Stabilized-Zirconia--719-1.html)

Al$_2$TiO$_5$

For Al$_2$TiO$_5$, with an orthorhombic crystal structure, the relationship is:

$\beta_v = \alpha_a + \alpha_b + \alpha_c$

Where $\beta_v$ = Volumetric thermal expansion coefficient
$\alpha_i$ = thermal expansion coefficients of principal crystal axes $\alpha_a 20-520 - \alpha_a 20-1000 = -2.9 - -3\times10^{-6}/°$ C.

$\alpha_b 20-520 - \alpha_b 20-1000 = 10.3-11.8\times10^{-6}/°$ C.

$\alpha_c 20-520 - \alpha_c 20-1000 = 20.1-21.8\times10^{-6}/°$ C.

(Rivero Palacio F. "Reactive Sintering of Aluminum Titanate"; Irene Barrios de Arenas; Instituto Universitario de Tecnologia; Venezuela; p. 503. http://cdn.intechopen.com/pdfs/29796.pdf)

The temperature range of interest is −40° C. to >120° C. (−40° F. to >>248° F.). Therefore, using the largest of the values, the thermal expansion over the temperature range of interest is as follows:

For $\alpha_{3YSZ}(-40°$ C.$-1000°$ C.$)=11\times10^{-6}\times(160)=0.18\%$

For $\alpha_{a\ Al2TiO5}(-40°$ C.$-1000°$ C.$)=-3\times10^{-6}\times(160)=-0.05\%$ For $\alpha_{b\ Al2TiO5}(-40°$ C.$-1000°$ C.$)=11.8\times10^{-6}\times(160)=0.19\%$ For $\alpha_{c\ Al2TiO5}(-40°$ C.$-1000°$ C.$)=21.8\times10^{-6}\times(160)=0.35\%$ Using these formulas, the thermal expansion was calculated to be well below the <5% expansion desired for the separator over the temperature range of interest.

Electrical Insulation (Electrical Volume Resistivity)

Typical definitions of material resistivities are:
for conductors ($\leq 10^{-8}$ Ω·cm),
for semiconductors ($\sim 10^{-8}$-$10^{16}$ Ω·cm), and
for insulators ($\geq 10^{16}$ Ω·cm)·7

The formula for calculating resistivity is:

$\rho = R \cdot A / \ell$ where:
R is the electrical resistance of a uniform specimen of the material (measured in ohms),
A is the cross-sectional area of the specimen (measured in square meters) and
$\ell$ is the length of the piece of material (measured in meters).

Figure 24:
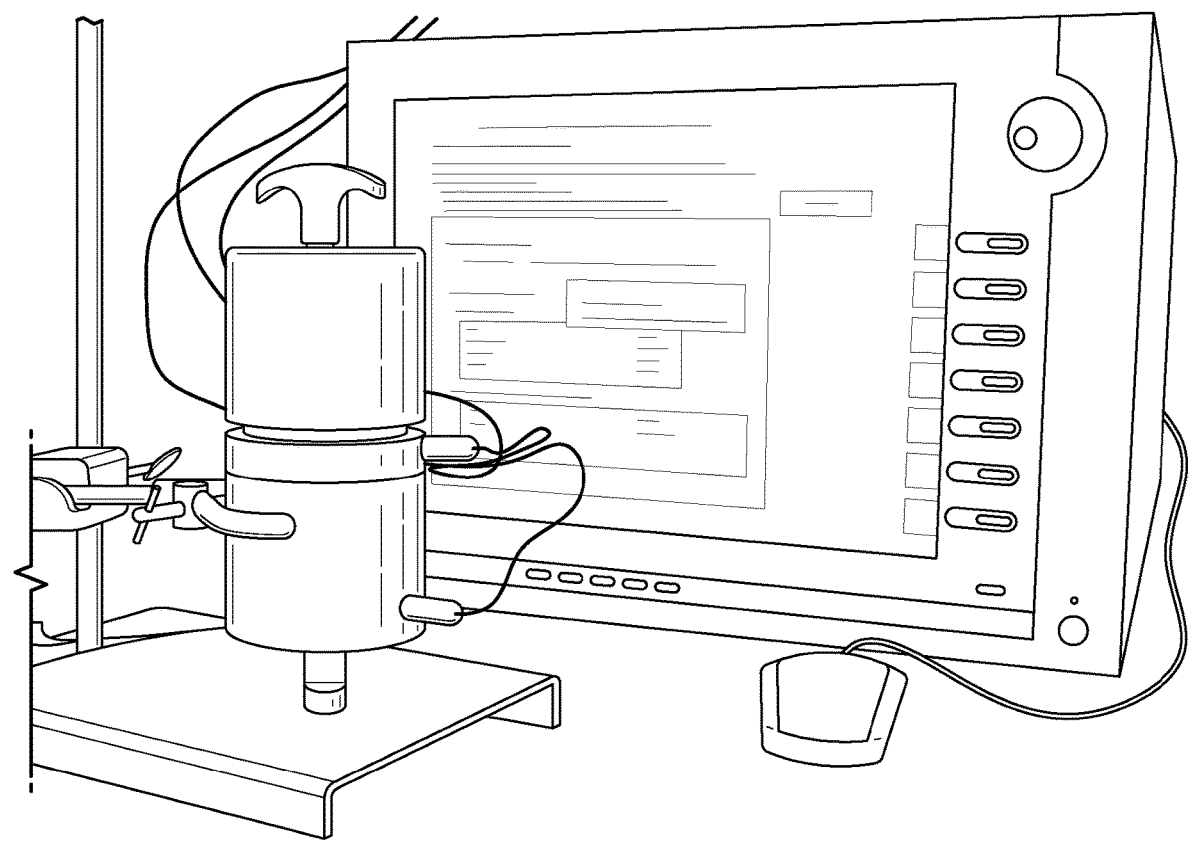
FIG. 24 shows an Agilent B1500A display with two probes for measuring resistivity.

High impedance resistivity measurements were made using an Agilent B1500A Semiconductor Device Analyzer Mainframe with B1500A-903 Power Cord and B1511AFG Medium Power Source/Monitor Unit Module (Agilent Technologies, Inc.; Wilmington, Del.) together with a set of 5 pound RT-1000 and CP-1111 Concentric Ring Probe electrodes (Static Solutions, Inc., Marlborough, Mass.), shown in FIG. 24. Celgard, ManniGlas, and Al$_2$TiO$_5$ samples were measured. There was substantial noise in the data, indicating the samples were near or within the detection limit, so the values found are minimum resistance values. The data for volume resistivity is shown in Table 6. Since the text book value for $Al_2TiO_5$ is $10^{14}$ Ohm-cm, the lower measured value may be due to the limitations of the Agilent test unit, or to impurities from processing.

TABLE 6

RESISTIVITY MEASUREMENTS

|  | Celgard | ManniGlas | $Al_2TiO_5$ |
|---|---|---|---|
| Amperage (amps) | $<1.78 \times 10^{-9}$ | $<2.52 \times 10^{-8}$ | $<7.37 \times 10^{-7}$ |
| Resistance | $>1.69 \times 10^8$ | $>1.2 \times 10^8$ | $>4.07 \times 10^6$ |
| Voltage (volts) | 3 | 3 | 3 |
| Diameter (inch) | 1 | 1 | 1 |
| Sample thickness | 25 μm | 381 μm | 380 μm |
| Resistivity (Ohm-cm) | $>3.43 \times 10^{11}$ | $>1.60 \times 10^9$ | $>5.43 \times 10^8$ |

Resistance to Corrosion from LOHB Electrolytes

Figures 25A, 25B:
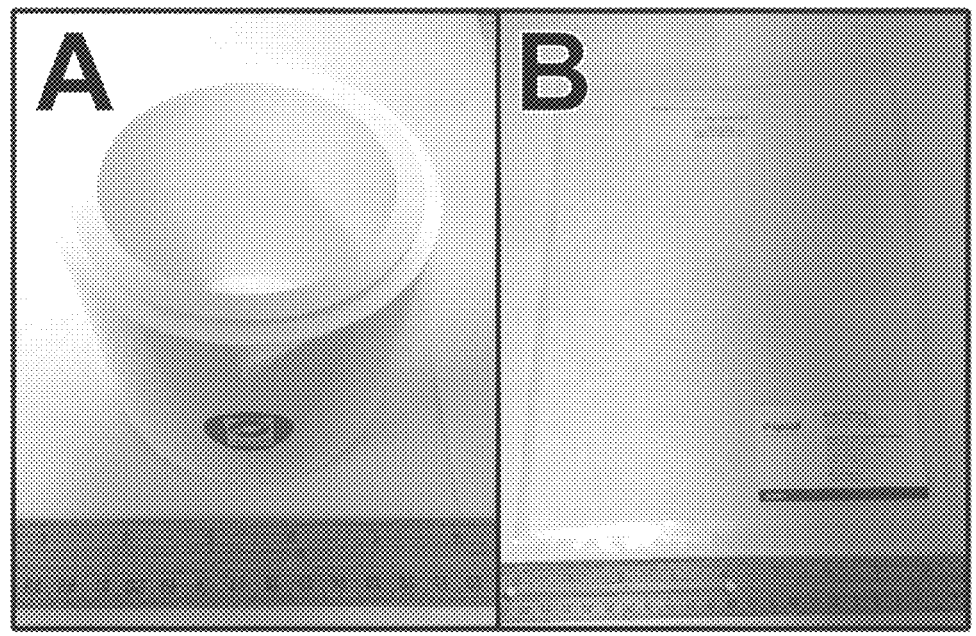
FIGS. 25A and 25B show commercially available Celgard® (A) and ManniGlas® (B) separators.
Figures 26A, 26B:
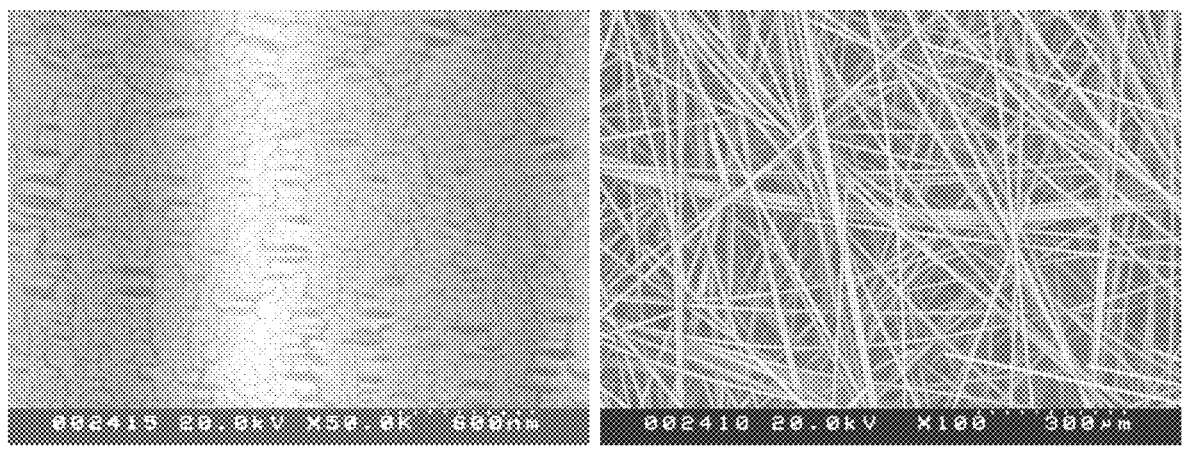
FIGS. 26A and 26B are SEM images taken for Celgard® (A) and ManniGlas® (B).
Figures 27A, 27B, 27C, 27D:
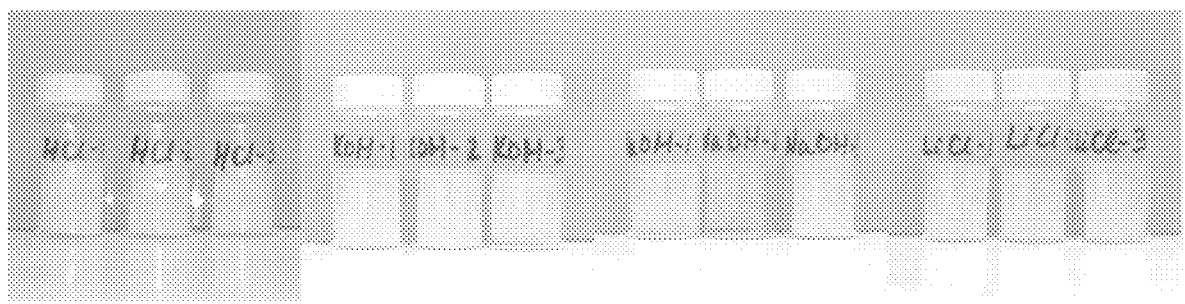
FIGS. 27A-27D illustrate corrosion testing of three samples of Celgard® separator immersed in 12N HCl (27A), 5M KOH (27B), 5M NaOH (27C) and 2M LiCl (27D) at testing initiation.
Figures 28A, 28B, 28C, 28D:
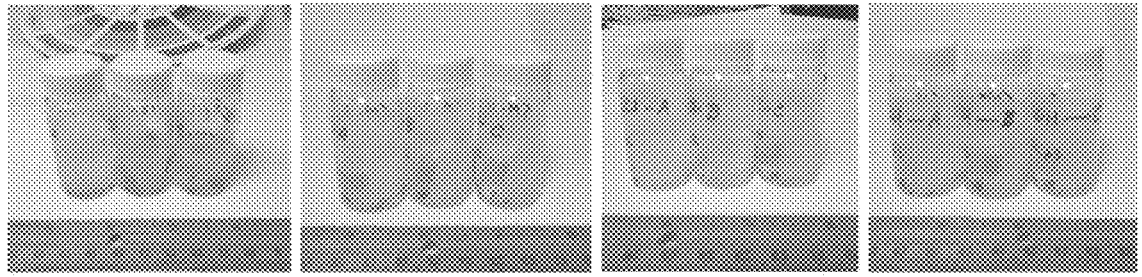
FIGS. 28A-28D. illustrate corrosion testing of three samples each of ManniGlas® separator in 12N HCl (28A), 5M KOH (28B), 5M NaOH (28C), and 2M LiCl (28D) at testing initiation.
Figures 29A, 29B, 29C, 29D:
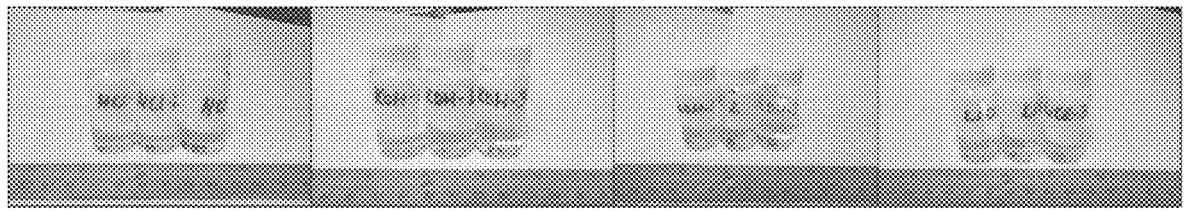
FIGS. 29A-29D. illustrate corrosion testing of a three samples each of Celgard® separator in 12N HCl (29A), 5M KOH (29B), 5M NaOH (29C), and 2M LiCl (29D) after 26 days.
Figures 30A, 30B, 30C, 30D:
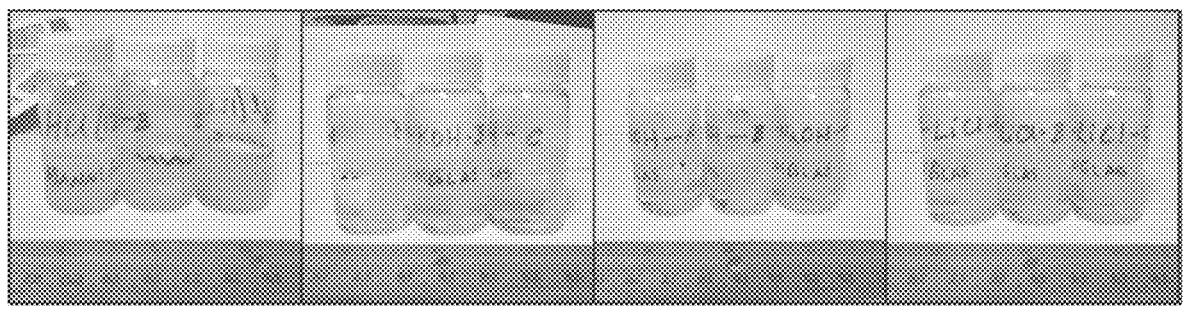
FIGS. 30A-30D illustrate corrosion testing of a three samples each of ManniGlas® separator in 12N HCl (30A), 5M KOH (30B), 5M NaOH (30C), and 2M LiCl (30D) after 9 days.

Commercial Separators:

As set forth above, two commercial separator materials, Celgard® and ManniGlas®, were used as reference standards for testing. SEM images of the surface of the Celgard and ManniGlas separators materials are shown in FIGS. 25A and 25B respectively. The Celgard pore size ranges from about 60 to about 120 nm. It should be noted that Celgard is very easily stretched, so much larger values can be obtained by stretching the material. The pore size for the ManniGlas is listed in the literature as much larger, but the value is unclear as a cross section of the ManniGlas appears to show a much smaller effective pore size.

Corrosion testing was conducted on control samples of the separators. Twelve samples of 1 in.×1 in. squares of Celgard separator was weighed and then placed in individual glass vials with 15 mL of electrolyte. Three samples were tested in each of the following electrolytes.

Hydrochloric acid—commercial 12N HCl aqueous solution
Potassium hydroxide—5 molar aqueous solution
Sodium hydroxide—5 molar aqueous solution
Lithium chloride—2 molar aqueous solution
Sulfuryl chloride
Thionyl chloride FIGS. 27A-27D shows 12 vials containing Celgard samples at the start of testing and FIGS. 28A-28D show 12 vials of ManniGlas samples at the start of the corrosion tests. The samples were viewed and photographed once a week.

Figures 31A, 31B:
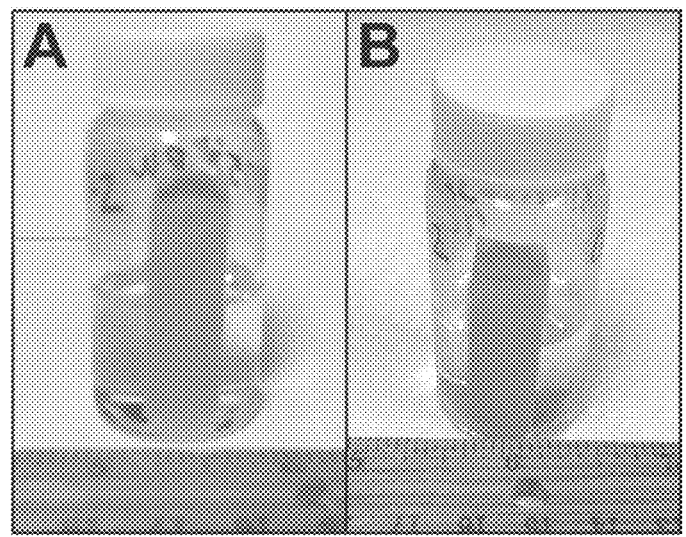
FIGS. 31A and 31B show that the Al$_2$TiO$_5$ strip is still intact after 12 days (31A) and 68 days (31B) in 12N HCl aqueous solution.
Figures 32A, 32B, 32C, 32D:
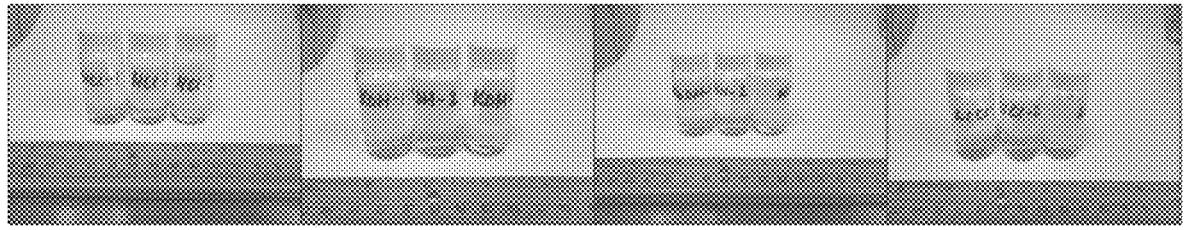
FIGS. 32A-32D show the Celgard® separator after ~58 days in 12N HCl (32A), 5M KOH (32B), 5M NaOH (32C), and 2M LiCl (32D).
Figures 33A, 33B, 33C, 33D:
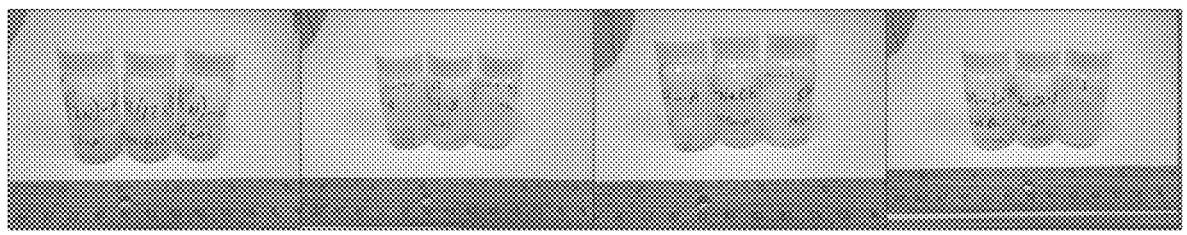
FIGS. 33A-33D. show the ManniGlas® separator after ~40 days in 12N HCl (33A), 5M KOH (33B), 5M NaOH (33C), and 2M LiCl (33D).

FIGS. 29A-29D show images of the Celgard containing vials after 26 days of exposure to the electrolytes. FIGS. 30A-30D show the ManniGlas samples after 9 days exposure. The flexible ceramic substrates produced as described herein were subjected to the same exposure testing The MannGlass samples in 12N HCl was destroyed by the HCl, no discernible separator material remained and only a cloud of loose glass fibers was observed. On the other hand, a fired sample of $Al_2TiO_5$ tape exposed to 15 mL of a 12N HCl aqueous solution was intact after 12 days, (FIG. 31A) and after 68 days (FIG. 31B).

FIGS. 32A-32D show vials containing Celgard after exposure for 58 days and FIG. 33A-33D show ManniGlas after exposure for 40 days in the KOH, NaOH and LiCl.

Corrosion Testing in Thionyl Chloride

Figures 34A, 34B, 34C:
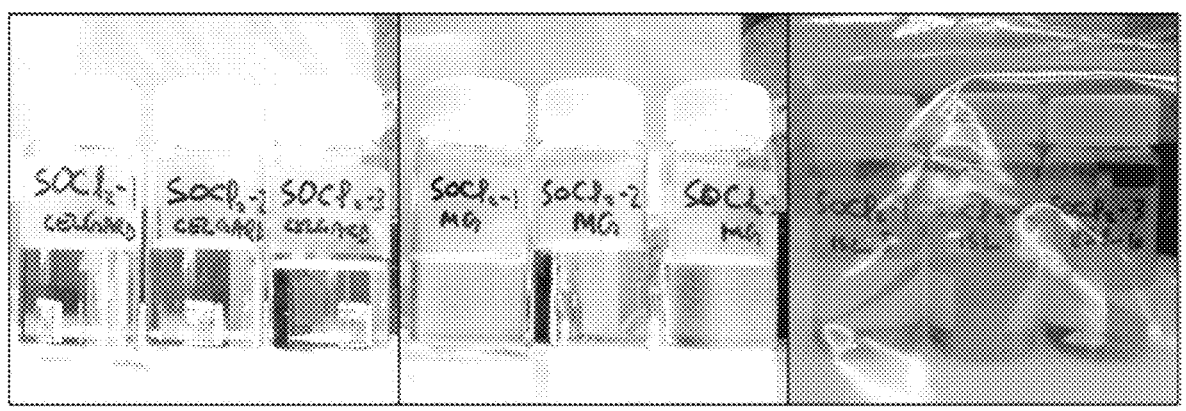
FIGS. 34A-34C show the initial samples of Celgard, ManniGlas, and Al$_2$TiO$_5$, respectively, in thionyl chloride.
Figures 35A, 35B, 35C:
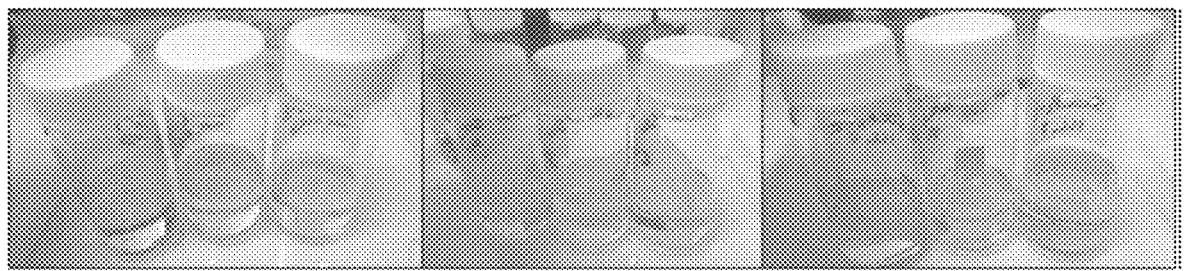
FIGS. 35A-35C shows samples of Celgard, ManniGlas, and Al$_2$TiO$_5$, respectively, in thionyl chloride; the Celgard is transparent in 15 days.

Celgard, ManniGlas, and $Al_2TiO_5$ samples were also placed in 99% thionyl chloride. FIGS. 34A-34C show images of the initial immersion. The Celgard in thionyl chloride was transparent after 15 days (FIG. 35A) while the CeRollS $Al_2TiO_5$ appears to be unchanged (FIG. 35C).

Corrosion Testing in Sulfuryl Chloride

Figures 36A, 36B, 36C:
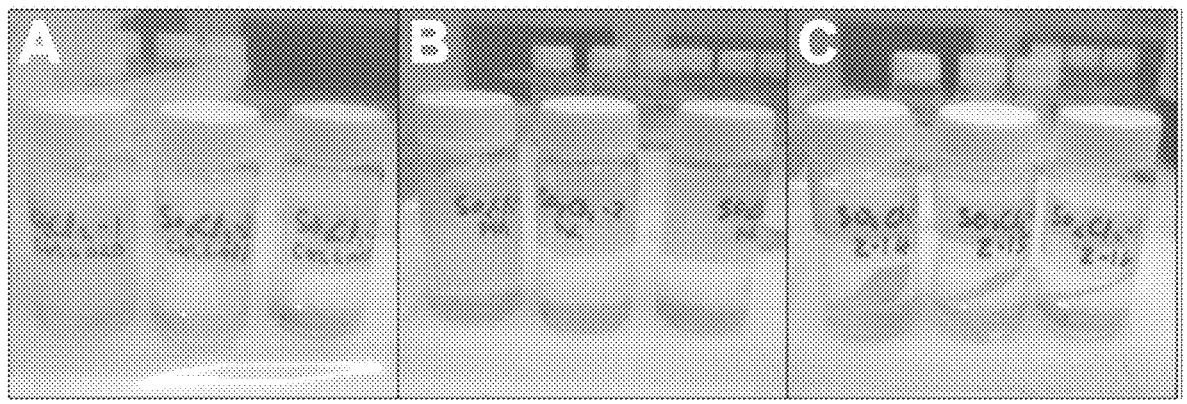
FIGS. 36A-36C show the initial samples of Celgard (A), ManniGlas (B), and Al$_2$TiO$_5$ (C) in sulfuryl chloride.
Figures 37A, 37B, 37C:
FIGS. 37A-37C shows the samples of Celgard, Manni-Glas, and Al$_2$TiO$_5$ in sulfuryl chloride after 19 days.

Celgard, ManniGlas, and $Al_2TiO_5$ samples were also tested in 97% sulfuryl chloride. Samples of Celgard, ManniGlas, and $Al_2TiO_5$ immersed in sulfuryl chloride. are shown in FIG. 36A-36C respectively. No degradation of the separator materials was seen on the initial day of immersion. FIGS. 37A-37C show samples of Celgard, ManniGlas, and $Al_2TiO_5$ immersed in sulfuryl chloride after 19 days immersion; no degradation of the separator materials was observed. The Celgard, ManniGlas and the $Al_2TiO_5$ samples still appear to be unaffected >26 days in thionyl chloride. The corrosion results for the various materials are summarized in Table 7 below.

TABLE 7

SUMMARY OF CORROSION RESISTANCE

| Property/ Material | Celgard ® (2325) | Manniglas ® 1200 | ISL $Al_2TiO_5$ CeRollS |
|---|---|---|---|
| CHEMICAL PROPERTIES | | | |
| Material | 100 wt % polyethylene-polypropylene PP/PE/PP | Fiberglass-polymer composite | 100 wt % ceramic |
| Corrosion resistance | Transparent in thionyl chloride in 15 days, Intact at 86 days in 12N HCl, Intact at 26 days in sulfuryl chloride | Decomposed in 12 N HCl in 9 days, Intact at 54 days in thionyl chloride, Intact at 26 days in sulfuryl chloride | Intact at 89 days in 12N HCl, Intact at 54 days in thionyl chloride, & Intact at 19 days in sulfuryl chloride |

Ion Permeability

Figure 38:
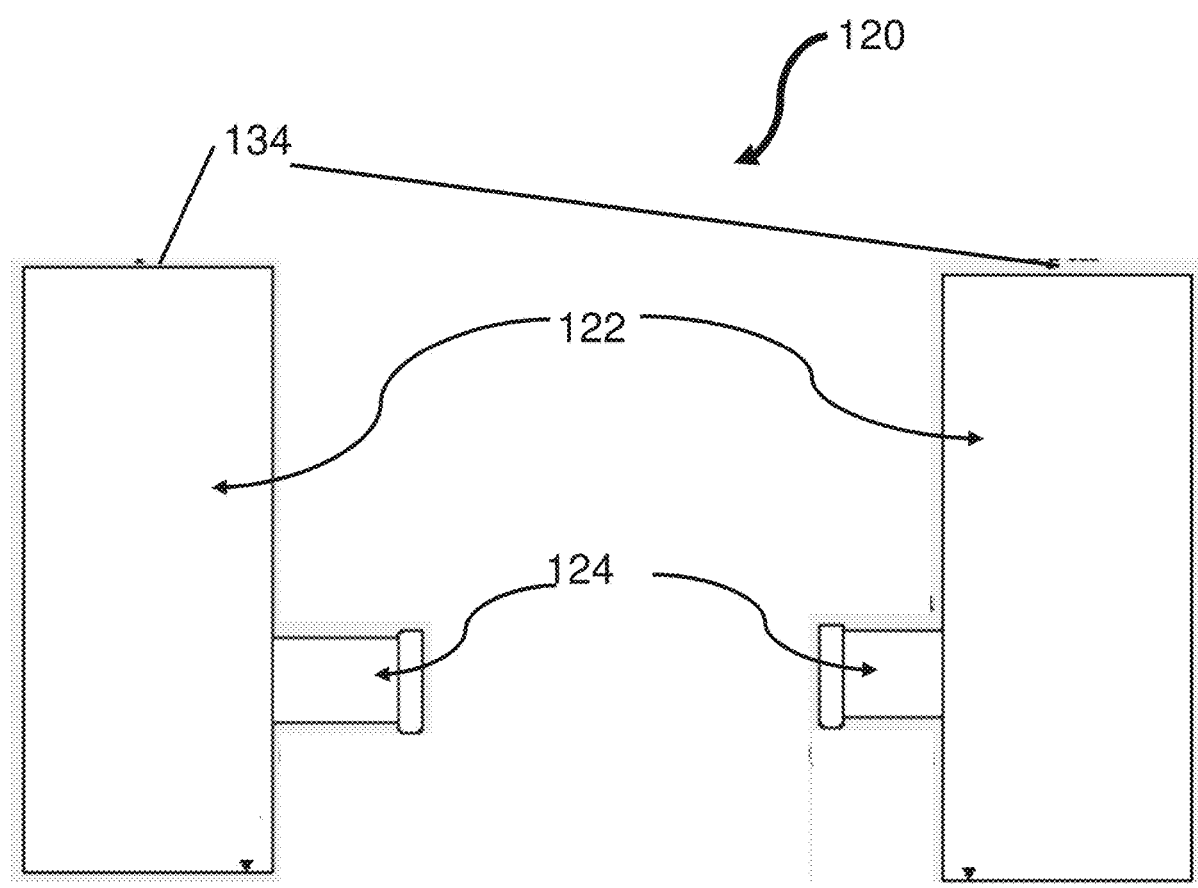
FIG. 38 is a schematic drawing of a glass electrochemical test cell with left and right components.
Figure 39:
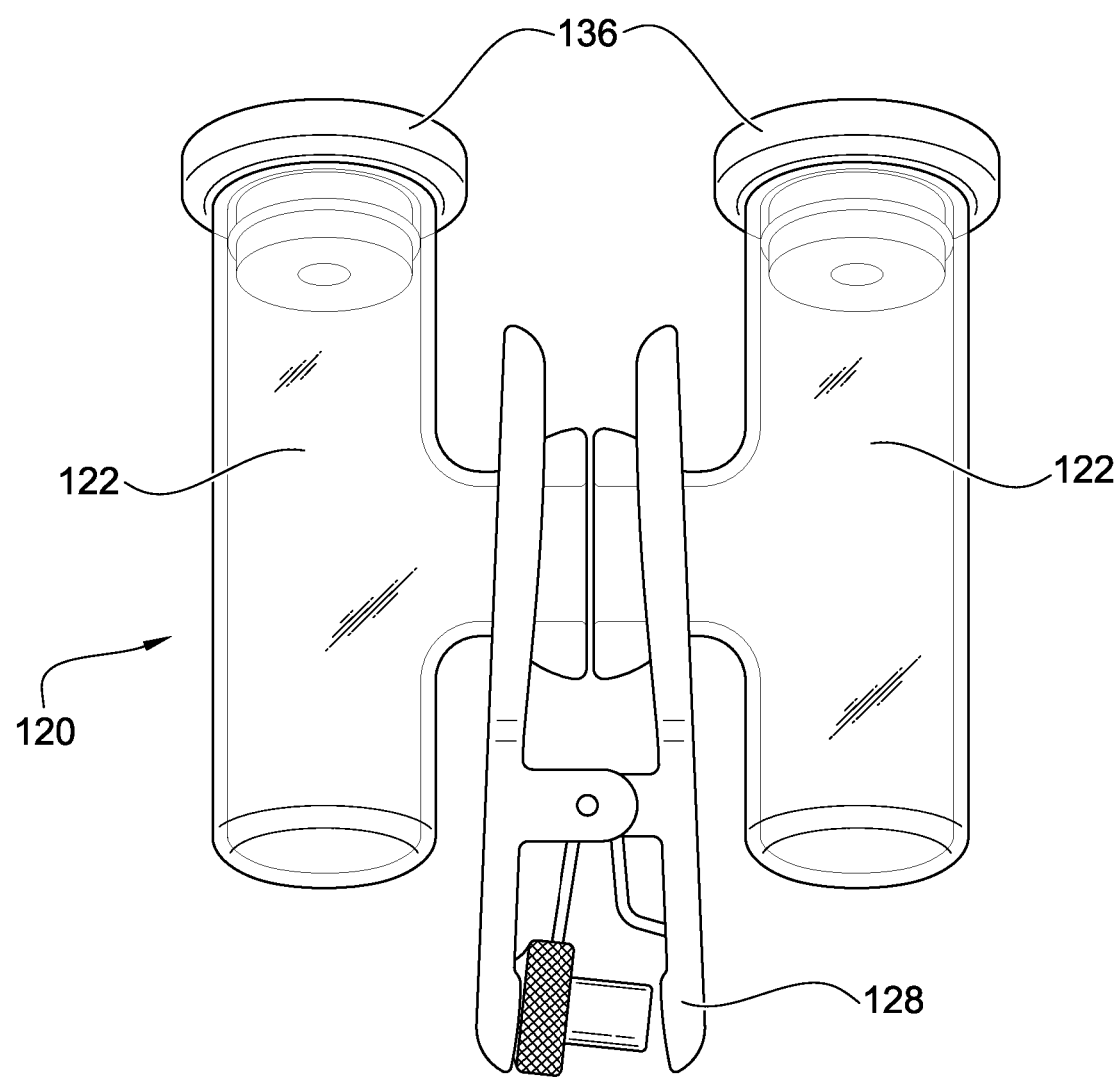
FIG. 39 is a photograph of the actual glass test cell. Each separator material is evaluated individually by being placed between the two side tubes, the side tubes being held in place with a retainer clamp.
Figure 40:
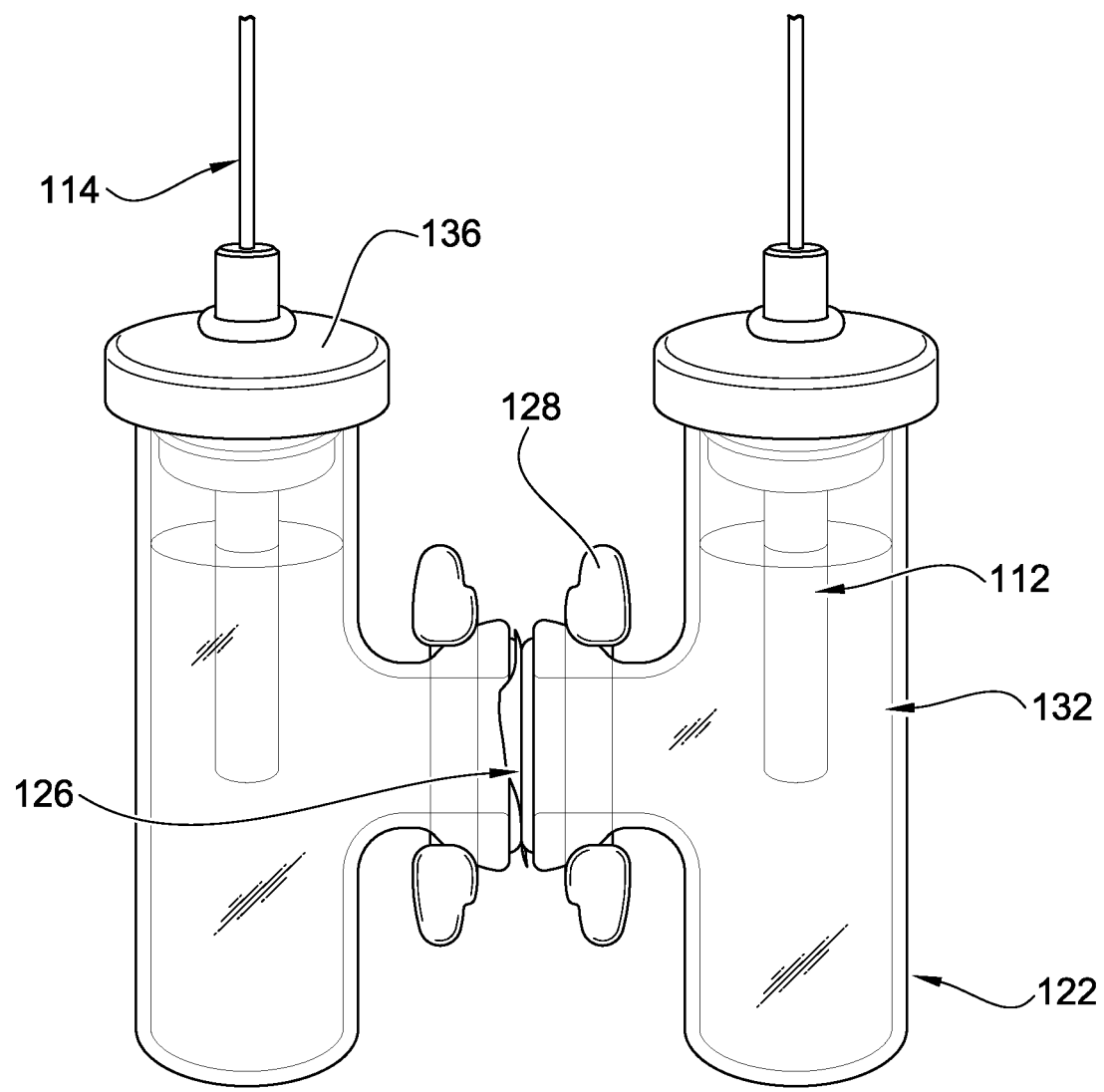
FIG. 40 shows the EC test cell with a Celgard separator being evaluated for ion permeability.

The test apparatus 120 for testing ion permeability consists of two matching glass receptacles (test cells) 122 with side arms 124 which provide an interconnecting region extending from the side of each test cell. Flat separator samples 126 were placed between the side arms 124 and these two side arms 124 were joined with a clamp 128 or sealing wax 130. An electrolyte 132 was poured into each of the glass receptacles 122. The open tops 134 of the receptacles 122 each had Teflon plugs 136 with platinum electrodes 138 penetrate therethrough and into the test electrolyte 132 in the receptacles 122. A schematic drawing of the test apparatus is shown in FIG. 38. FIGS. 39 and 40 show the glass test cells 122 assembled together with the separator samples 126 extending across the junction of the cells. The two commercial grade separator materials (Celgard 25 μm batch 0011603 and 0.015 inch thick ManniGlas 1200) were evaluated using this two chambered electrochemical (EC) cell 120. Their cyclic voltammetry profiles were measured in aqueous salt solution using a Princeton Applied Research Potentiostat Model 265A.

Figures 41A, 41B:
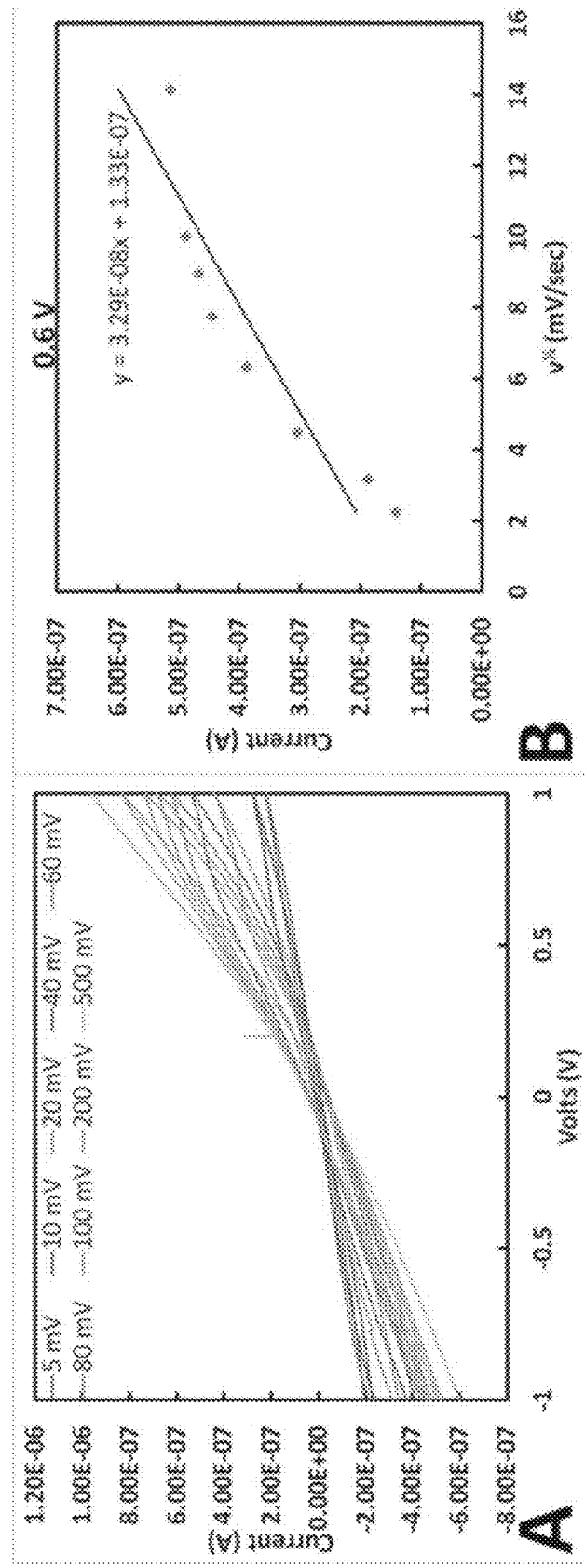
FIG. 41A shows cyclic voltammetry data for Celgard with rising scan rates.
FIG. 41B shows the slope extracted from the rising peak.

A 1.5-inch square of separator material 126 was placed between the side arms 124 of the two receptacles 122 of the EC cell 120 and secured using O-Rings 1 (not shown) and a clamp 138 (FIG. 40). The cell was then filled with the electrolyte solution 132 composed of 0.1 M sodium sulfate and 0.01 M potassium ferrocyanide. A total of 40 mL of the electrolyte solution was used to fill the cells with. 20 mL on either side of the separator 126 (in each chamber). A pair of platinum electrodes 138 with active areas of 0.31 cm² was used, with an electrode 138 placed in each receptacle 122 half cell on either side of the separator 126. After the electrical connections were made, cyclic voltammetric sweeps were conducted between −1 to +1 V. The cyclic voltammetry data for the Celgard sample is shown in FIGS. 41A and 41B.

The diffusion coefficient of the separator was calculated using the slope extracted from the anodic peak current versus square root of the scan rate plot shown in FIG. 41B based on the rearranged Nernst equation below:

$$D = \left(\frac{\text{Slope}}{2.69 \times 10^5 \times n^{3/2} \times A \times C_o}\right)^2$$

Where:
D is the diffusion coefficient
n is the electron transferred
A is the surface area of the working electrode, and
$C_O$ is the molar concentration Using the Nernst equation, the diffusion coefficient was calculated to be $2.562 \times 10^{-19}$ cm2/s for Celgard.

Figure 42:
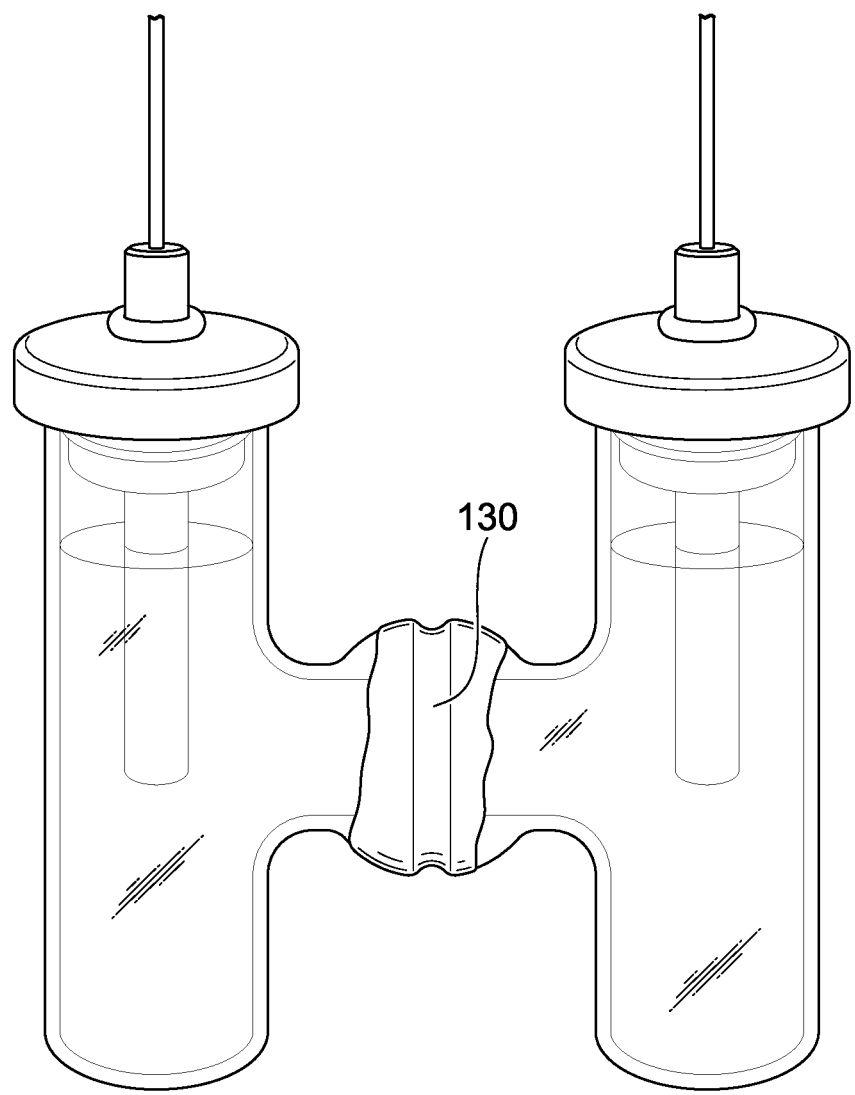
FIG. 42 shows a custom EC test cell with a ManniGlas separator being evaluated for ion permeability. Because leakage occurred due to the physical properties of the ManniGlass material the cell was wrapped with Parafilm® instead of using a clamp.
Figure 44A:
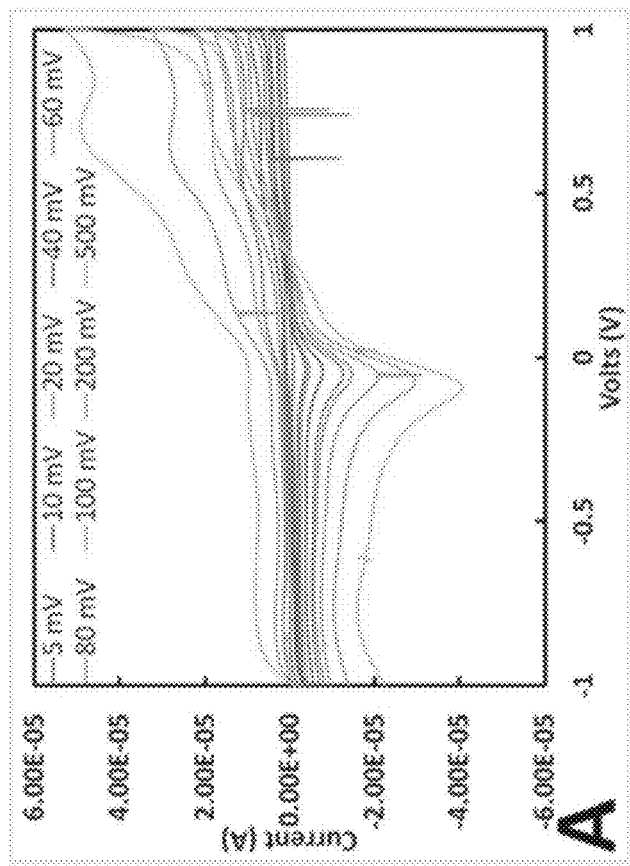
FIG. 44A shows cyclic voltammetry data from a potentiostat for Al$_2$TiO$_5$ (sample 072716RW 3091-1-1) with rising scan rates.
Figure 44B:
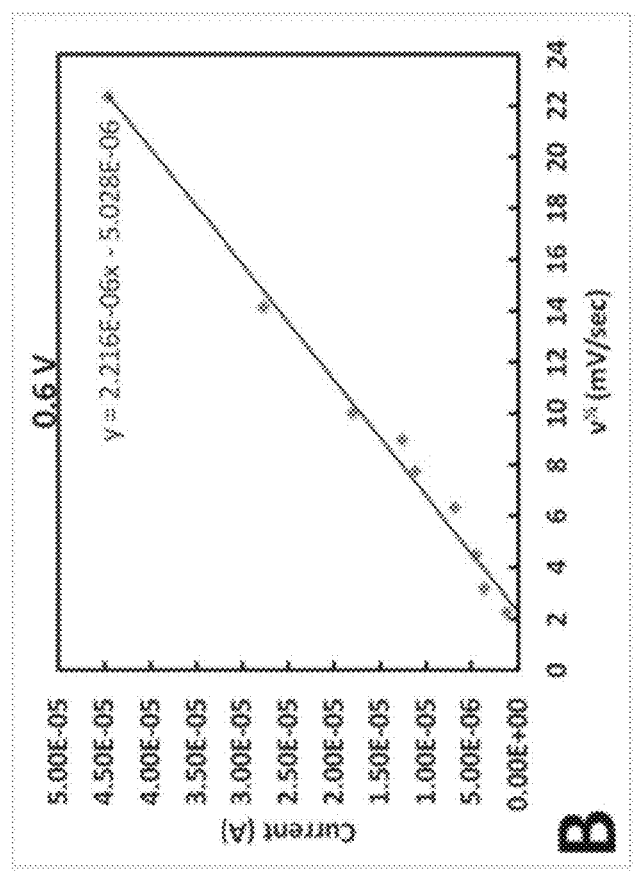
FIG. 44B shows the slope extracted from the rising peak.
Figures 45A, 45B:
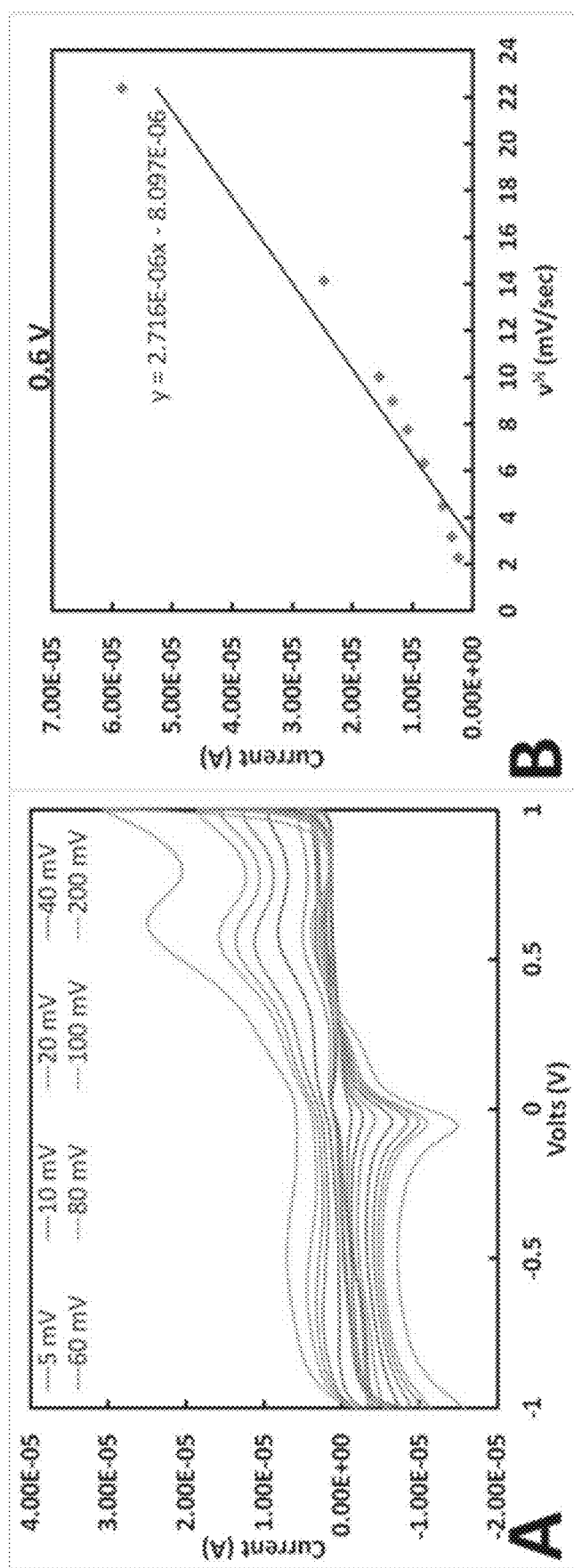
FIG. 45A shows cyclic voltammetry data from a potentiostat for Al$_2$TiO$_5$ (Sample 072716RW 3091-1-10) with rising scan rates.
FIG. 45B shows the slope extracted from the rising peak.

The same experiment was repeated for the ManniGlas 1200 separator (Lydal Performance Materials, Inc., NY). However; after setup, the sponge-like properties of wetted ManniGlas caused the electrolyte to seep out of the cell despite the pressure applied by the O-Rings (FIG. 42). In order to prevent leakage, Parafilm® (Bemis N A, Wis.) 130 was used to further seal the joint and prevent the electrolyte from seeping out of the cell. The cyclic voltammetry was then conducted and the data shown in FIGS. 43A and 43B was generated. Utilizing the Nernst equation above, the diffusion coefficient was calculated to be $7.50 \times 10^{-16}$ cm²/s.

The same experiment was repeated for two ISL CeRollS $Al_2TiO_5$ separators. Cyclic voltammetry was conducted and the data generated for these two samples is shown in FIGS. 44A, 44B, 45A and 45B. Using the Nernst equation, the diffusion coefficient was calculated to be, $1.162 \times 10^{-15}$ and $1.75 \times 10^{-15}$ cm2/s, respectively.

In summary, ManniGlas® has a higher rate of diffusion than Celgard®. However, Celgard is more robust and does not deteriorate in 12N HCl. The electrochemical evaluation of ISL's CeRollS separator material compared with commercial separator materials is summarized in Table 8. $Al_2TiO_5$ has the lowest (most desirable) ion permeability at $\sim 10^{-15}$ cm²/sec.

TABLE 8

THE ION PERMEABILITY VALUES FOR TWO COMMERCIALLY AVAILABLE CONTROLSEPARATORS AND TWO CEROLLS BASED ON $AL_2TIO_5$

| PARAMETER | CELGARD ® | MANNIGLAS ® | $Al_2TiO_5$ | $Al_2TiO_5$ |
|---|---|---|---|---|
| D (cm²/s) | $2.56 \times 10^{-19}$ | $7.50 \times 10^{-16}$ | $1.16 \times 10^{-16}$ | $1.75 \times 10^{-16}$ |
| THICKNESS, μm | 25 | 381 | 132 | 185 |

Mechanical Flexibility

Figure 46:
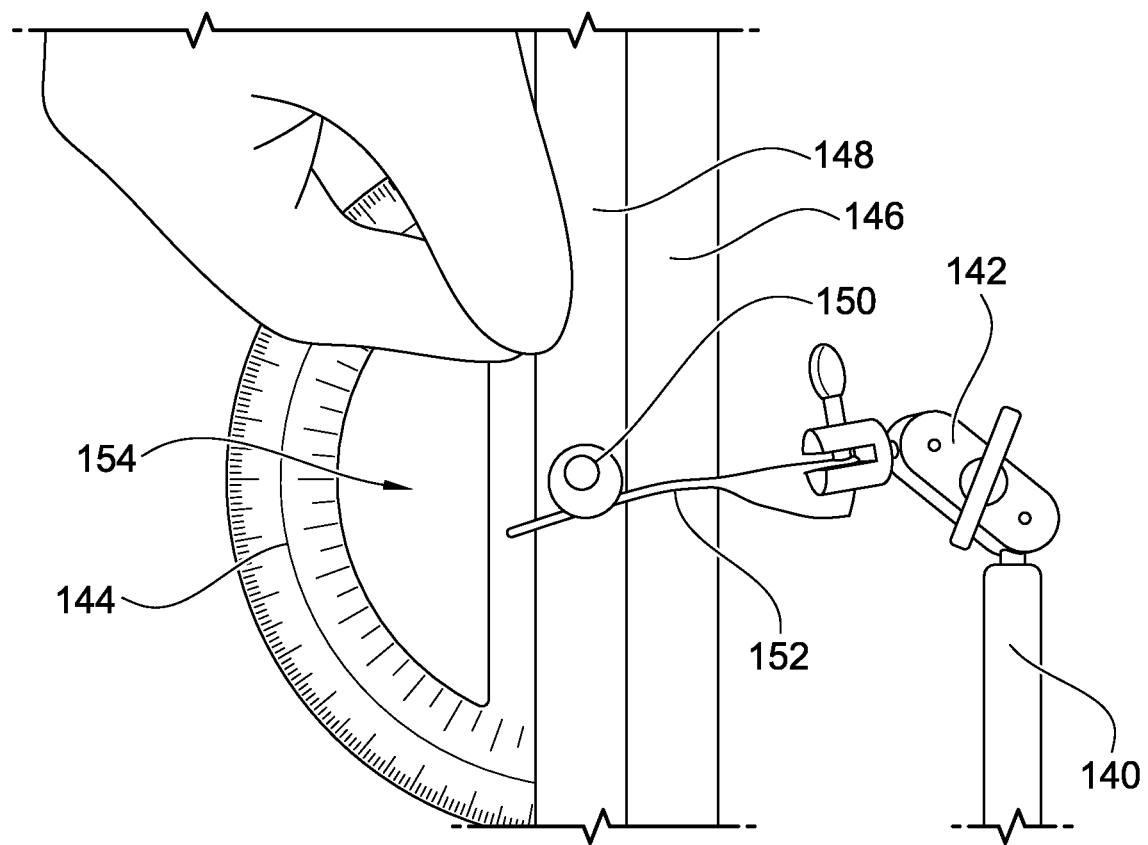
FIG. 46 demonstrates the flexibility for an Al$_2$TiO$_5$ sample.

Normally failure in ceramic materials has been catastrophic, meaning that a crack usually propagates resulting in a catastrophic failure of the piece. However, there are a variety of exceptions to this rule. A salt crystal can bend nearly 360 degrees in water, since the dislocations are dissolved in the bending process. In recent years, high temperature super-plasticity has been widely reported for some ceramic systems. Two different mechanisms of failure for the presently described ceramic materials were evaluated. Flexibility was quantitatively measured using a test device 154, shown in FIG. 46, consisting of a small photographic copy stand 140, a standard digital camera (not shown), a standard third arm tool 142, a protractor 144, a stationary wooden vertical member 146 resting on the copy stand base, and a parallel movable wooden member 148 with a vertically mounted 8 mm diameter tube 150. To conduct the flexibility test the second movable vertical member was manually moved with the vertical 8 mm diameter tube against the sample 152 held at a 0 degree position by the third arm until fracture occurred. The flexibility of the $Al_2TiO_5$ ceramic membrane separator test sample 152 can be seen in FIG. 46. The angle of fracture for classic ceramics is less than 1 degree, while FIG. 46 illustrates a 25 degree flexure for the $Al_2TiO_5$ material formed in accordance with the procedures described herein. This significantly increased flexibility has never been reported in the literature for any itacolumite type (microcrack hinge based) flexible material.

Statistically Designed Experiment to Determine the Control Variables for Sample Curling A statistically designed experiment (Design of Experiment or DOE) was developed to determine the control variable responsible for the persistent problem of sample curling. It was found that the curling occurred during drying, although some additional curling caused by firing may have occurred as well. The DOE is shown in Table 9. The samples are ranked from 0 (no curling) to 5 (the worst curling). Samples were produced from a larger batch of $Al_2TiO_5$ slip (100316RW3091-2). Some samples were produced by dicing a nominal 1.5 in×1.5 in square, while others were stacks of alternating layers of 1.5 in×1.5 in squares of the cast dried slip. Samples were then pressed for various times and temperatures, as well as dried at various temperatures and times.

The commercial software package used to assist in planning and interpreting the DOE was Design Expert-Stat-Ease. A model for the correlation and response surfaces was developed that shows that there is less than a 0.0353 chance that the correlations and response surface are generated by random chance.

Figure 47:
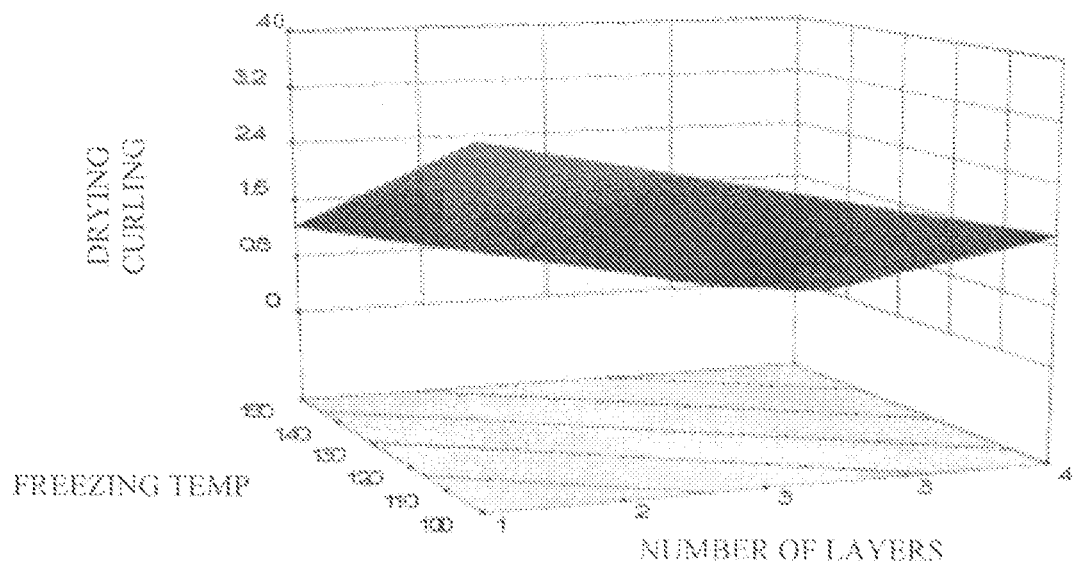
FIG. 47 is a three dimensional graph showing that curling is minimized by using a large number of layers and a higher pressing temperature.
Figure 48:
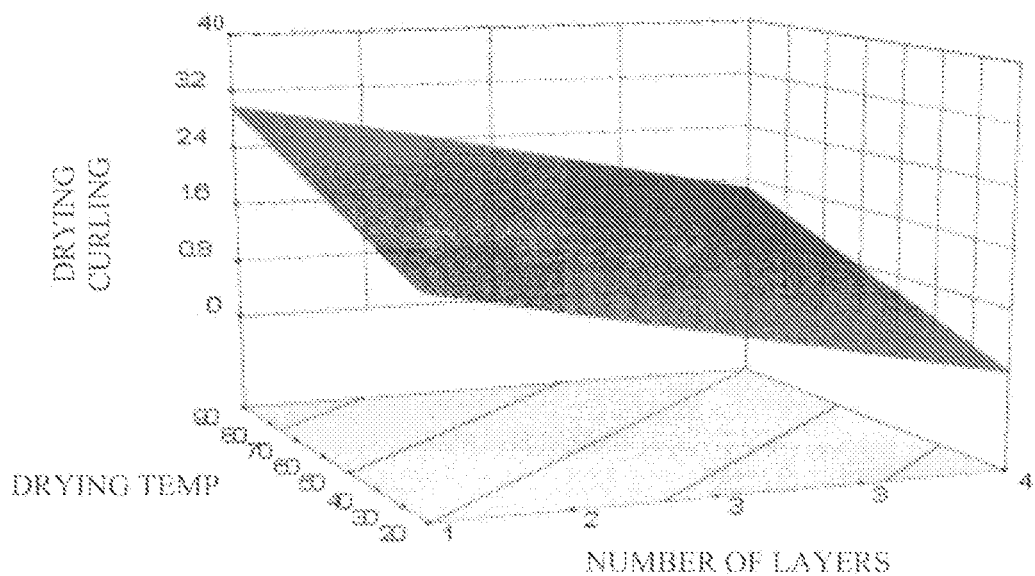
FIG. 48 is a graph showing that curling is also minimized by using a large number of layers and a lower drying temperature.

It was found that there is little, if any, effect on curling from either pressing time or drying time, within the ranges investigated. The control variables responsible for curling include: number of layers, pressing temperature, and drying temperature. This can be seen in FIGS. 47 and 48. Curling is minimized by using a large number of layers, higher pressing temperatures, and a lower drying temperature.

It has been concluded that tape squares larger than 1 inch×1 inch can be readily cast and fired using $Al_2TiO_5$ and larger sizes and different shapes can also be produced. Two examples of larger sized test samples (1.5 inch×1.5 inch square) are shown in FIG. 49. Based on these results, further improvements in size and physical properties can be readily obtained by optimizing tape formulations and slip processing, improved drying conditions, and using higher and better optimized firing temperatures. Scale-up of the slip size can be accomplished and separator materials of at least three (3) inch diameter circular separators can be produced.

TABLE 9

DESIGN OF EXPERIMENT (DOE) TO DETERMINE CONTROL VARIABLES FOR CURLING DUE TO DRYING

| Std | Run | A: No OF LAYERS | B: PRESSING TEMP C. | C: PRESSING TIME min | D: DRYING TEMP Klb | E: DRYING TIME h | DRYING CURLING |
|---|---|---|---|---|---|---|---|
| 7 | 1 | 1 | 150 | 10 | 20 | 2 | 0.5 |
| 1 | 2 | 1 | 100 | 3 | 90 | 16 | 4 |
| 4 | 3 | 4 | 150 | 3 | 90 | 2 | 0.5 |
| 5 | 4 | 1 | 100 | 10 | 90 | 2 | 4 |
| 6 | 5 | 4 | 100 | 10 | 20 | 16 | 0.5 |
| 2 | 6 | 4 | 100 | 3 | 20 | 2 | 1.5 |
| 3 | 7 | 1 | 150 | 3 | 20 | 16 | 0.5 |
| 8 | 8 | 4 | 150 | 10 | 90 | 16 | 0.5 |

CONCLUSION

The above and the attached Figures demonstrates the feasibility of producing an all-ceramic separator for use in lithium oxyhalide batteries (LOHB) to provide extended battery life. This decreases the frequency of battery replacement and, in turn, decreases costs, increases reliability, and increases the up-time for battery powered systems in remote or locations not easily accessed. Ceramic materials were developed that can be cast into green (unfired) tape from both 3YSZ and $Al_2TiO_5$ and drying protocols have been established to eliminate curling of the tapes during firing. The materials produced were testing for resistivity, corrosion, and ion permeability and demonstrated good results when compared with commercial separators. Specifically, 1.5×1.5 inch fired tape were cast from 3YSZ and $Al_2TiO_5$, fired tape from $Al_2TiO_5$ is sufficiently robust to allow for testing for ion permeability, and CeRollS formed from $Al_2TiO_5$ shows good DC resistivity, good corrosion resistance in thionyl chloride and sulfurylchloride, and better ion permeability than commercially available Celgard or ManniGlas Separators.

An all-ceramic separator that can perform in lithium oxyhalide batteries to extend the life of the battery has been demonstrated. This can decrease the frequency of battery replacement, thus decreasing costs, increasing reliability, and increasing the up-time for systems using lithium oxyhalide battery systems. Specifically, the ability to fabricate flexible films and/or tapes from ceramic materials with good resistivity and corrosion resistance for use in the harsh electrolytes typical of LOHBs, and having better ionic permeability compared to commercial separators, has been demonstrated.

The data herein demonstrates the ability to provide an innovative all-ceramic separator system. The materials developed can facilitate a replacement of commercial separators currently in lithium oxyhalide batteries which will avoid thermal and chemical breakdown and reduce the risk of fire and explosions. The performance characteristics of these materials meet or exceed the performance of commercial separator materials presently used lithium oxyhalide batteries in the areas of resistance to corrosion, electrical resistivity, and ion permeability.

We claim:

1. A lithium oxyhalide battery comprising layers of negative and positive electrode materials, the layers of said negative and positive electrode materials spaced apart by one or more layers of a flexible $Al_2TiO_5$ or Yttria Stabilized Zirconia ceramic battery separator to form a layered structure with the positive electrode material connected to a positive current collector and the negative electrode material connected to a negative current collector to form a layered structure.

2. The electrical battery of claim 1 wherein the one or more layers of the preformed, cast flexible $Al_2TiO_5$ or Yttria Stabilized Zirconia ceramic battery separator comprise a substantially flat ceramic film having a thickness from about 25-290 μm.

3. The electrical battery of claim 2 wherein said ceramic film has physical properties suitable for use as a porous separator for use in said electrical battery.

4. The electrical battery of claim 2 wherein the preformed, cast flexible ceramic film comprising $Al_2TiO_5$ has an ion permeability from about $1.1 \times 10^{-15}$ to about $1.8 \times 10^{-15}$ cm$^2$/sec.

5. The electrical battery of claim 2 wherein the $Al_2TiO_5$ ceramic film is inert to exposure to electrolytes.

6. The electrical battery of claim 5 wherein the electrolyte is selected from the group consisting of HCl, KOH, NaOH, LiCl, thionyl chloride, and sulfuryl chloride.

7. The electrical battery of claim 2 wherein the preformed, cast $Al_2TiO_5$ film has pore sizes from about 0.5 to about 42 μm.

8. The electrical battery of claim 2 wherein the preformed, cast $Al_2TiO_5$ film has an electrical resistivity of $>5.4 \times 10^8$ Ohm-cm.

9. The electrical battery of claim 2 wherein the preformed, cast $Al_2TiO_5$ film has an ion permeability from about $1.1 \times 10^{-15}$ to about $1.8 \times 10^{-15}$ cm$^2$/sec.

10. The electrical battery of claim 2 wherein the preformed, cast Yttria Stabilized Zirconia film has an ion permeability from about $3.5 \times 10^{-16}$ to about $6.2 \times 10^{-16}$ CM$^2$/sec.

11. The electrical battery of claim 1 wherein the layered structure is formed into a rolled structure.

12. The lithium oxyhalide battery of claim 1 wherein the flexible $Al_2TiO_5$ or Yttria Stabilized Zirconia ceramic battery separator is formed by
   a. casting a film of ceramic particles in combination with a fugitive organic binder, said particles in a first instance a final size after milling ranging from 15-30 μm and in a second instance a final size after milling from 5-20 μm to form a tape,
   b. drying the tape at ambient temperature with relative humidity (RH) ranging from 30-60%
   c. pressing the dry tape at about 0-3 Klb and about 25-52° C.,
   d. placing the dry tape on an inert substrate and heating the dry tape in air at least 1500° C. for at least 8 hours to form a fired tape, and
   e. cooling the fired tape to room temperature over a period of 2-12 hours.

13. The lithium oxyhalide battery of claim 12 further including forming the flexible $Al_2TiO_5$ or Yttria Stabilized Zirconia ceramic battery separator by applying pressure to the dry tape during the formation of the fired tape.

* * * * *